US010545349B1

(12) United States Patent
Sullivan et al.

(10) Patent No.: US 10,545,349 B1
(45) Date of Patent: Jan. 28, 2020

(54) FACIAL-INTERFACE CUSHION, SYSTEM, AND METHOD FOR HEAD-MOUNTED DISPLAYS

(71) Applicant: FACEBOOK TECHNOLOGIES, LLC, Menlo Park, CA (US)

(72) Inventors: Joseph Patrick Sullivan, Seattle, WA (US); Shane Michael Ellis, Bellevue, WA (US); Quintin Morris, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 257 days.

(21) Appl. No.: 15/594,263

(22) Filed: May 12, 2017

(51) Int. Cl.
G02B 27/01 (2006.01)
B29C 43/02 (2006.01)
B29C 43/52 (2006.01)
B29C 65/70 (2006.01)
B29C 65/00 (2006.01)
B29K 101/10 (2006.01)
B29K 101/12 (2006.01)
B29K 491/00 (2006.01)
B29L 31/58 (2006.01)

(52) U.S. Cl.
CPC .......... G02B 27/0176 (2013.01); B29C 43/02 (2013.01); B29C 43/52 (2013.01); B29C 65/70 (2013.01); B29C 66/727 (2013.01); B29K 2101/10 (2013.01); B29K 2101/12 (2013.01); B29K 2491/00 (2013.01); B29L 2031/58 (2013.01)

(58) Field of Classification Search
None
See application file for complete search history.

(56) References Cited

U.S. PATENT DOCUMENTS 3,012,283 A    12/1961  Foster et al.
3,919,368 A *  11/1975  Seto ..................... B29C 44/08
                                                            264/249

(Continued)

OTHER PUBLICATIONS

Joseph Patrick Sullivan et al.; Facial-Interface Systems for Head-Mounted Displays; U.S. Appl. No. 15/495,775, filed Apr. 24, 2017.

(Continued)

Primary Examiner — Stella K Yi
(74) Attorney, Agent, or Firm — FisherBroyles, LLP

(57) ABSTRACT

A method for manufacturing a facial-interface cushion for a head-mounted display may include (1) positioning a foam layer between a recessed mold member and an insertion mold member of a mold assembly, with a first end portion of the foam layer overlapping a second end portion of the foam layer, (2) forcing the insertion mold member against the foam layer in a direction toward the recessed mold member, thereby forming a shaped foam element including a first end portion that is compressed against a second end portion between the insertion mold member and the recessed mold member, and (3) heating the shaped foam element to form a facial-interface cushion by softening the shaped foam element and bonding the first end portion of the shaped foam element to the second end portion of the shaped foam element. Various other facial-interface cushions, systems, and methods for head-mounted displays are also disclosed.

12 Claims, 14 Drawing Sheets

(56) References Cited

U.S. PATENT DOCUMENTS

| | | | |
|---|---|---|---|
| 4,241,131 | A | 12/1980 | Bailey |
| 6,196,223 | B1 * | 3/2001 | Belfer ................ A41D 13/1176 128/205.25 |
| 8,605,008 | B1 | 12/2013 | Prest |
| 9,332,337 | B2 | 5/2016 | Ridler |
| 9,778,467 | B1 | 10/2017 | White |
| 2006/0154567 | A1 | 7/2006 | Jung-Shun |
| 2006/0179554 | A1 | 8/2006 | Barton |
| 2009/0287282 | A1 | 11/2009 | Biser |
| 2011/0225709 | A1 | 9/2011 | Saylor |
| 2012/0070027 | A1 | 3/2012 | Ridler |
| 2012/0255104 | A1 | 10/2012 | Didier |
| 2014/0139407 | A1 | 5/2014 | Abdollahi |
| 2015/0238361 | A1 | 8/2015 | McCulloch |
| 2017/0090514 | A1 | 3/2017 | Byun |
| 2017/0094816 | A1 | 3/2017 | Yun |
| 2017/0255019 | A1 | 9/2017 | Lyons |

OTHER PUBLICATIONS

Joseph Patrick Sullivan et al.; Facial-Interface Cushion, System, and Method for Head-Mounted Displays; U.S. Appl. No. 15/616,539, filed Jun. 7, 2017.

Flextech, Inc.; About Compression Molding; http://www.flextechfoam.com/production-capabilities/compression-molding/; as accessed Jun. 20, 2017.

BASF; Thermoplastic Polyurethane Elastomers (TPU)—Elastollan—Material Properties; http://www.polyurethanes.basf.de/pu/solutions/us/function/conversions:/publish/content/group/Arbeitsgebiete_und_Produkte/Thermoplastische_Spezialelastomere/Infomaterial/elastollan_material_uk.pdf, Nov. 2011.

New Oculus Rift Facial Interfaces with Replacement Foam Pads; https://www.kickstarter.com/projects/1869563556/new-oculus-rift-facial-interfaces-with-replacement; as accessed Jun. 20, 2017 (dated Jul. 6, 2016).

VR Cover; Oculus Rift Facial Interface & Foam Replacement Standard Set; https://vrcover.com/product/oculus-rift-facial-interface-foam-replacement-standard-set-2/; as accessed Jun. 20, 2017.

Greenbaum; Sport / Hygienic Interface for Head Mounted Display; https://nyvirtualreality.wordpress.com/2014/02/26/sport-hygienic-interface-for-head-mounted-display/; as accessed Jun. 20, 2017 (dated Feb. 26, 2014).

Greenbaum; Exercise HMD: Update; https://nyvirtualreality.wordpress.com/2014/04/07/exercise-hmd-update/; as accessed Jun. 20, 2017 (dated Apr. 7, 2014).

UFP Technologies; Reticulated Polyurethane Foam; https://www.ufpt.com/materials/foam/reticulated-polyurethane-foam.html?utm_source=google&utm_medium=cpc&utm_term=reticulated%252Bfoam&utm_content=polyurethane-foam&utm_campaign=foam&gclid=Cl2Xj4Do6tMCFQ5xfgodxlQOpg; as accessed Jun. 20, 2017.

* cited by examiner

FACIAL-INTERFACE CUSHION, SYSTEM, AND METHOD FOR HEAD-MOUNTED DISPLAYS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

Conventional virtual reality headset systems may include cushioned facial interfaces that allow users to position the headsets on their faces. Unfortunately, while the cushioned facial interfaces often include cushions to directly contact a user's face, the cushions are commonly die-cut from foam sheets resulting in angular edges that may uncomfortably dig into the user's skin and leave marks on the user's face. Processes used to cut the cushions may involve cutting an oblong cushion from a foam sheet, resulting in the generation of wasted foam material that is discarded following the cutting. Additionally, such cushions may poorly dissipate heat during use, resulting in discomfort to the user and fogging of the headset lenses and eyeglasses worn by the user. While covers may be placed over the cushions to mitigate discomfort from the angular foam edges, such covers may add undesirable bulk to the facial interfaces and may further prevent dissipation of heat during use.

SUMMARY

As will be described in greater detail below, the instant disclosure generally relates to facial-interface cushions, systems, and methods for head-mounted displays. In one example, a method for manufacturing a facial-interface cushion for a head-mounted display may include (1) positioning a foam layer for producing a facial-interface cushion for a head-mounted display between a recessed mold member and an insertion mold member of a mold assembly, with the foam layer overlapping at least a portion of a mold channel defined in the recessed mold member and a first end portion of the foam layer overlapping a second end portion of the foam layer, (2) forcing the insertion mold member against the foam layer in a direction toward the recessed mold member such that at least a portion of the foam layer is forced into the mold channel defined in the recessed mold member toward a channel bottom surface, thereby forming a shaped foam element including a first end portion that is compressed against a second end portion between the insertion mold member and the recessed mold member, (3) heating the shaped foam element to form the facial-interface cushion by softening the shaped foam element and bonding the first end portion of the shaped foam element to the second end portion of the shaped foam element, and (4) removing the facial-interface cushion from the mold assembly.

In some embodiments, the first end portion of the shaped foam element may overlap the second end portion of the shaped foam element in a portion of the shaped foam element having a reduced thickness between the insertion mold member and the recessed mold member. In at least one example, the first end portion of the shaped foam element may overlap the second end portion of the shaped foam element in a portion of the shaped foam element corresponding to a portion of the facial-interface cushion shaped to abut a nasal region of a user's face.

According to some embodiments, the shaped foam element may further include a curved surface disposed within the mold channel. In this example, the curved surface of the shaped foam element may not contact at least a portion of the recessed mold member defining the mold channel. In one example, at least a portion of the curved surface of the shaped foam element may contact a curved surface of the recessed mold member defining at least a portion of the mold channel.

In some embodiments, the shaped foam element may be entirely disposed within the mold channel defined in the recessed mold member. In at least one embodiment, a portion of the shaped foam element may be disposed outside the mold channel defined in the recessed mold member. In this example, the portion of the shaped foam element disposed outside the mold channel may be compressed between a surface of the recessed mold member and a surface of the insertion mold member facing the surface of the recessed mold member. The mold channel defined in the recessed mold member may extend along an arcuate path.

According to some embodiments, the insertion mold member may include a protruding portion sized to fit within the mold channel defined in the recessed mold member. In this example, forcing the insertion mold member against the foam layer may further include forcing the protruding portion of the insertion mold member against a portion of the foam layer overlapping at least the portion of the mold channel defined in the recessed mold member. In at least one example, the foam layer may include at least one of a thermoplastic material or a thermosetting material.

A corresponding head-mounted-display cushion may include (1) a user-side surface dimensioned to abut a facial portion of a user, (2) a display-side surface dimensioned to abut a mounting surface of a facial-interface system for a head-mounted display, and (3) an overlapped region including a first end portion overlapping and bonded to a second end portion.

In some embodiments, the head-mounted-display cushion may include a molded foam layer including the user-side surface, the display-side surface, and the overlapped region. The overlapped region may have a reduced thickness relative to other portions of the head-mounted-display cushion. In at least one example, the overlapped region may be shaped to abut a nasal region of the user's face.

According to some embodiments, the head-mounted-display cushion may further include a curved surface arcing from the user-side surface toward the display-side surface. In this example, the head-mounted-display cushion may further define an opening extending through an interior of the head-mounted-display cushion from the user-side surface to the display-side surface. The curved surface may define at least a portion of the opening. In some examples, the curved surface may be located on at least a portion of an outer periphery of the head-mounted-display cushion.

Similarly, a head-mounted-display system may include (1) a head-mounted display, (2) a facial-interface mounting member for the head-mounted display, and (3) a facial-interface cushion abutting the facial-interface mounting member. The facial-interface cushion may include (1) a user-side surface dimensioned to abut a facial portion of a user, (2) a display-side surface dimensioned to abut the facial-interface mounting member, and (3) an overlapped region including a first end portion overlapping and bonded to a second end portion.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
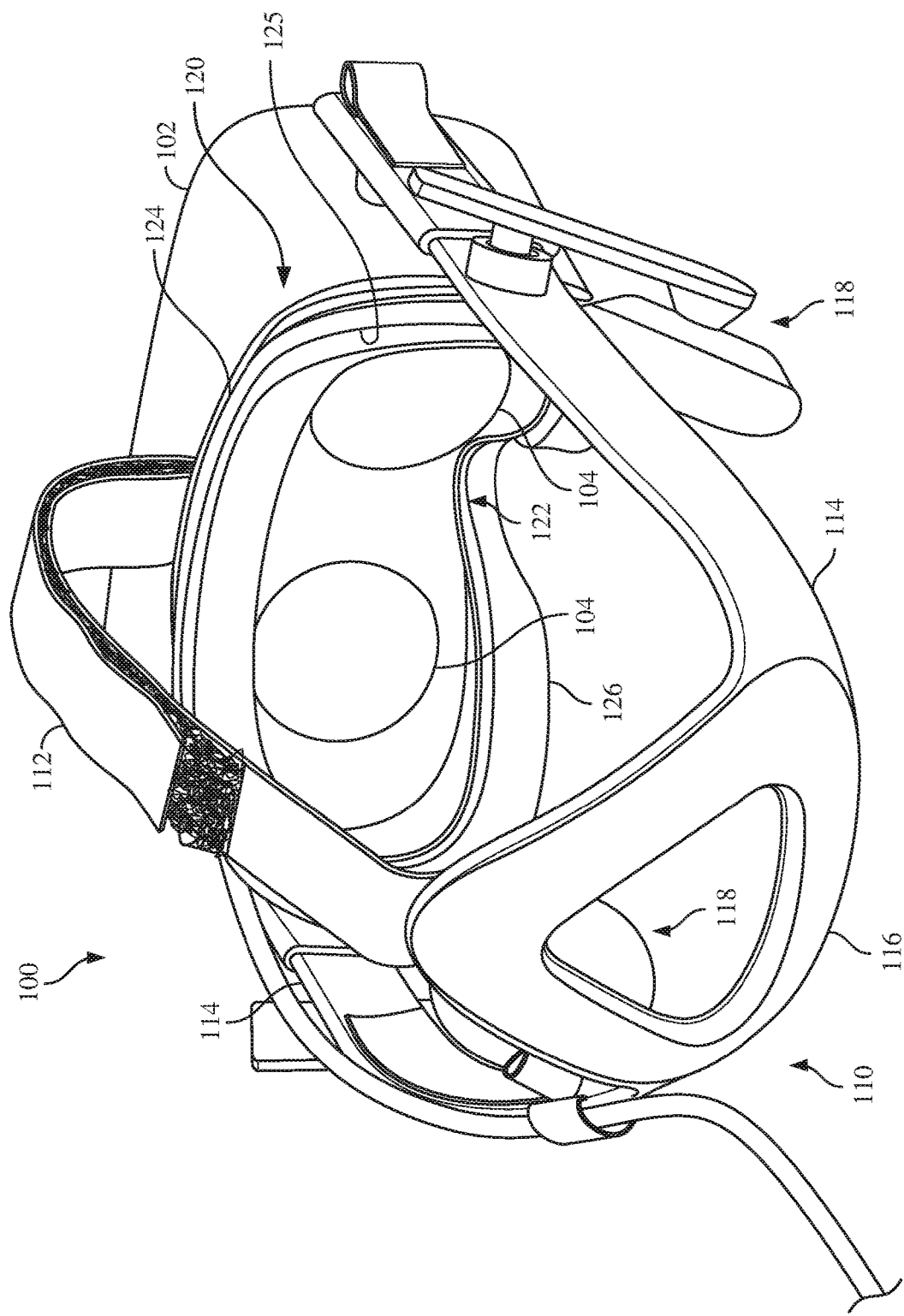
FIG. 1 is a perspective view of an exemplary head-mounted-display system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various facial-interface cushions, systems, and methods for head-mounted displays. As will be explained in greater detail below, embodiments of the instant disclosure may include facial-interface cushions (i.e., a head-mounted-display cushions) that may be attached to mounting surfaces of facial-interface systems for head-mounted displays. In some embodiments, a facial-interface cushion may include an overlapped region that includes a first end portion overlapping and bonded to a second end portion. In at least one embodiment, a facial-interface cushion may also include a user-side surface dimensioned to abut a facial portion of a user and one or more curved surfaces arcing from the user-side surface toward a display-side surface of the facial-interface cushion. The curved surfaces of the facial-interface cushion may provide a comfortable surface contacting the face of a user wearing a head-mounted display without adding bulk to the facial-interface system. In some embodiments, the facial-interface cushion may include a foam channel extending into the facial-interface cushion from the display-side surface. The foam channel may allow for movement of air and facilitate dissipation of heat in the facial-interface cushion, preventing user discomfort and fogging of head-mounted display lenses and eyeglasses worn by the user.

Embodiments of the instant disclosure may also include various methods for manufacturing facial-interface cushions from foam layers. The methods may utilize mold assemblies including recessed mold members and insertion mold members to mold the foam layers into facial-interface cushions. In at least one embodiment, a single strip-shaped foam layer may be disposed over at least a portion of a mold channel defined in a recessed mold member such that end regions of the foam layer overlap each other. At least a portion of the foam layer may then be forced into the mold channel by an insertion mold member to form a shaped foam element having overlapped end regions that are compressed against each other between the recessed mold member and the insertion mold member. The shaped foam element may be heated to form a facial-interface cushion by softening the shaped foam element, allowing the shaped foam element to assume a molded shape and bonding the overlapped end regions together. The formed facial-interface cushion may be subsequently removed from the mold assembly and cooled. The methods described herein may reduce generation of wasted foam material during the manufacturing process by utilizing strip-shaped foam layers, as opposed to arcuate and/or loop-shaped foam layers. A number of strip-shaped foam layers may be cut from adjacent regions of a foam sheet in such a manner that little or no waste is generated during the cutting operation. Additionally, the described methods may enable manufacturing of facial-interface cushions having a variety of beneficial features, such as curved surface portions and cooling channels. As discussed in greater detail below, these and other disclosed embodiments, whether used alone or in combination, may help optimize the immersiveness, enjoyability, and/or utility of a virtual- or augmented-reality experience.

The following will provide, with reference to FIG. 1, examples of head-mounted-display systems that include facial-interface cushions. In addition, the discussion associated with FIGS. 2-11, 16-21, 24, and 25 will provide examples of methods, systems, and components for manufacturing facial-interface cushions. Finally, the discussion corresponding to FIGS. 12-15, 22, and 23 will provide examples of facial-interface cushions.

FIG. 1 is a perspective view of a head-mounted-display system 100 in accordance with various embodiments. In some embodiments, head-mounted-display system 100 may include a head-mounted display 102, a strap system 110, an audio subsystem 118, and a facial-interface system 120. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may also display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

In various embodiments, head-mounted display 102 may include lenses 104 positioned to enable the user to view displayed content. Head-mounted display 102 may, for example, include right and left lenses 104 corresponding to the user's right and left eyes. Slightly different content may be displayed by separate display regions of head-mounted display 102 that are viewable by the user through each of right and left lenses 104, respectively, providing a three-dimensional viewing experience to the user.

In some embodiments, strap system 110 may be used for adjustably mounting head-mounted display 102 on the user's head. As shown in FIG. 1, strap system 110 may include an upper strap 112 and lower straps 114 that are coupled to head-mounted display 102 to adjustably conform to the top and/or sides of the user's head when the user is wearing head-mounted-display system 100. In some embodiments, strap system 110 may include a back piece 116 coupled with upper strap 112 and lower straps 114 to rest against the back of the user's head (e.g., around the user's occipital lobe).

In some embodiments, audio subsystem 118 may be integrated with head-mounted display 102 and may provide audio signals to the user's ears. Head-mounted-display system 100 may, for example, have two audio subsystems 118 located on the left and right sides of head-mounted-display system 100 to provide audio signals to the user's left and right ears.

In some embodiments, facial-interface system 120 may be configured to comfortably rest against a region of the user's face, including a region surrounding the user's eyes, when head-mounted-display system 100 is worn by the user. In these embodiments, facial-interface system 120 may include a facial-interface cushion 126 (i.e., a head-mounted-display cushion) that is coupled to a mounting surface 125 of a facial-interface mounting member 124. Facial-interface cushion 126 and facial-interface mounting member 124 may surround a viewing region 122 that includes the user's field of vision, allowing the user to look through lenses 104 of head-mounted display 102 without interference from outside light while the user is wearing head-mounted-display system 100. Facial-interface mounting member 124 may be coupled to head-mounted display 102 and/or may be integrally formed with at least a portion of head-mounted display 102. In some embodiments, facial-interface mounting member 124 may be removably coupled to head-mounted display 102 to allow for removal and attachment by a user. Additionally or alternatively, facial-interface mounting member 124 may be secured to and/or integrally formed with a portion of head-mounted display 102 such that facial-interface mounting member 124 is not easily removed by a user.

Figure 2:
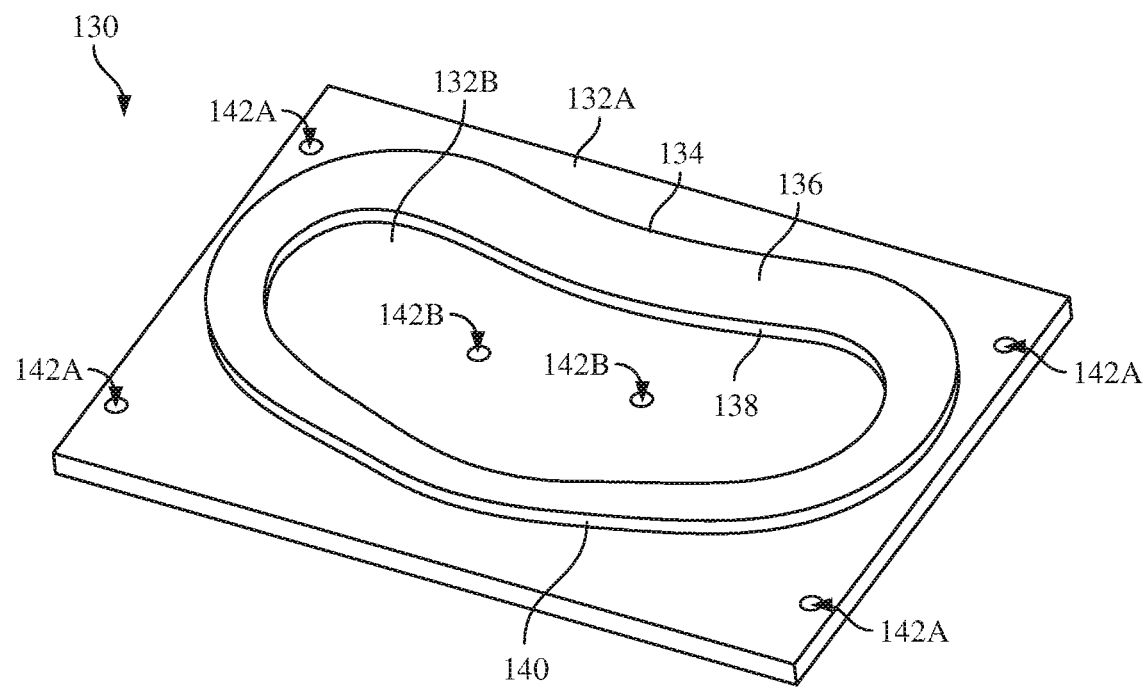
FIG. 2 is a perspective view of an exemplary insertion mold member of a mold assembly for manufacturing a facial-interface cushion.
Figure 3:
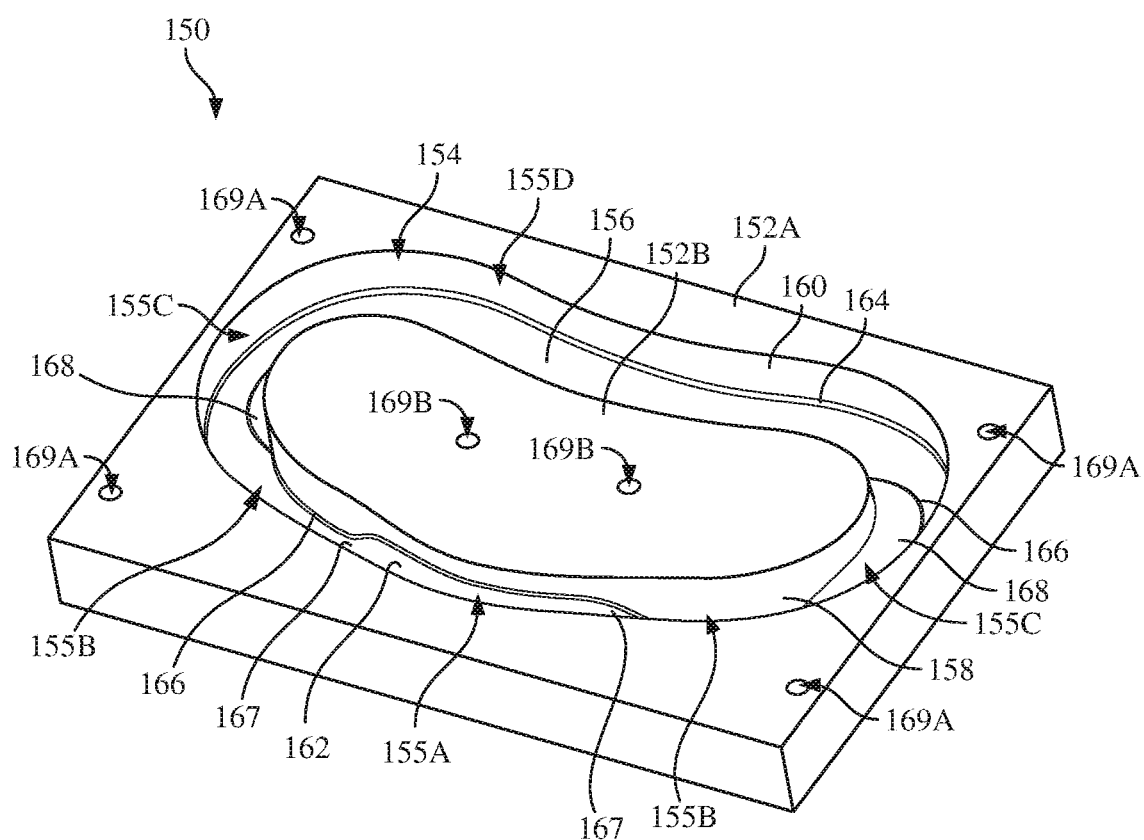
FIG. 3 is a perspective view of an exemplary recessed mold member of a mold assembly for manufacturing a facial-interface cushion.

FIGS. 2 and 3 are perspective views showing exemplary components of a mold assembly for manufacturing a facial-interface cushion 126 according to some embodiments. FIG. 2 illustrates an exemplary insertion mold member 130 and FIG. 3 shows an exemplary recessed mold member 150 that is utilized with insertion mold member 130 to mold and form facial-interface cushion 126 from a foam layer. Insertion mold member 130 and recessed mold member 150 may each include any suitable materials for molding facial-interface cushion 126 in a heated environment, without limitation. For example, insertion mold member 130 and/or recessed mold member 150 may include machined or molded metal (e.g., hardened steel, pre-hardened steel, aluminum, beryllium-copper allow, etc.). In some examples, portions of insertion mold member 130 and/or recessed mold member 150 may be plated with a suitable coating (e.g., nickel, chrome, titanium nitride, etc.) to prevent corrosion and/or wear.

As shown in FIG. 2, insertion mold member 130 may include an outer mold facing surface 132A and an inner mold facing surface 132B configured to face and/or contact corresponding facing surfaces of a recessed mold member 150, which will be discussed in greater detail below in reference to FIG. 3. Outer mold facing surface 132A and inner mold facing surface 132B may each have any suitable surface shape, without limitation. For example, outer mold facing surface 132A and/or inner mold facing surface 132B may be substantially planar surfaces.

Insertion mold member 130 may also include a protruding portion 134 that protrudes from outer mold facing surface 132A and/or inner mold facing surface 132B. Protruding portion 134 may be sized to fit within a mold channel (e.g., mold channel 154 shown in FIG. 3) defined in recessed mold member 150. As shown in FIG. 2, protruding portion 134 may include a protrusion end surface 136, a protrusion inner side surface 138, and a protrusion peripheral side surface 140. Protrusion end surface 136 may have any suitable surface shape, without limitation, including, for example, a substantially planar surface. Protrusion inner side surface 138 may extend between inner mold facing surface 132B and protrusion end surface 136 and protrusion peripheral side surface 140 may extend between outer mold facing surface 132A and protrusion end surface 136. In some examples, protruding portion 134 may extend along an arcuate path. For example, as shown in FIG. 2, protruding portion 134 may follow a looped path, with protrusion inner side surface 138 formed on an inner portion of the looped path surrounding inner mold facing surface 132B and protrusion peripheral side surface 140 formed on a periphery of the looped path surrounded by outer mold facing surface 132A.

In one embodiment, at least one alignment hole for aligning insertion mold member 130 with recessed mold member 150 shown in FIG. 3 may be defined within insertion mold member 130. For example, as illustrated in FIG. 2, a plurality of outer alignment holes 142A may be defined in insertion mold member 130 extending from outer mold facing surface 132A through at least a portion of insertion mold member 130. Additionally or alternatively, a plurality of inner alignment holes 142B may be defined in insertion mold member 130 extending from inner mold facing surface 132B through at least a portion of insertion mold member 130. One or more of outer alignment holes 142A and/or inner alignment holes 142B may, for example, extend through insertion mold member 130 in a thickness direction (e.g., a direction substantially perpendicular to outer mold facing surface 132A and/or inner mold facing surface 132B) from outer mold facing surface 132A and/or inner mold facing surface 132B to a rear surface of insertion mold member 130 opposite outer mold facing surface 132A and/or inner mold facing surface 132B.

FIG. 3 illustrates recessed mold member 150, which may include an outer mold facing surface 152A configured to face and/or contact corresponding outer mold facing surface 132A of insertion mold member 130 as part of a mold assembly (see, e.g., mold assembly 131 illustrated in FIGS. 8-11). Additionally, recessed mold member 150 may include an inner mold facing surface 152B configured to face and/or contact corresponding inner mold facing surface 132B of insertion mold member 130 as part of the mold assembly. Outer mold facing surface 152A and inner mold facing surface 152B may each have any suitable surface shape, without limitation. For example, outer mold facing surface 152A and/or inner mold facing surface 152B may be substantially planar surfaces.

Recessed mold member 150 may additionally define a mold channel 154 within a portion of recessed mold member 150. Mold channel 154 may extend into recessed mold member 150 from outer mold facing surface 152A and/or inner mold facing surface 152B. In some examples, mold channel 154 may extend along an arcuate path. For example, as shown in FIG. 3, mold channel 154 may follow a looped path corresponding to a looped path followed by protruding portion 134 of insertion mold member 130 such that protruding portion 134 of insertion mold member 130 is at least partially disposed within mold channel 154 of recessed mold member 150 as part of a mold assembly (see, e.g., mold assembly 131 illustrated in FIGS. 10 and 11).

Figure 4:
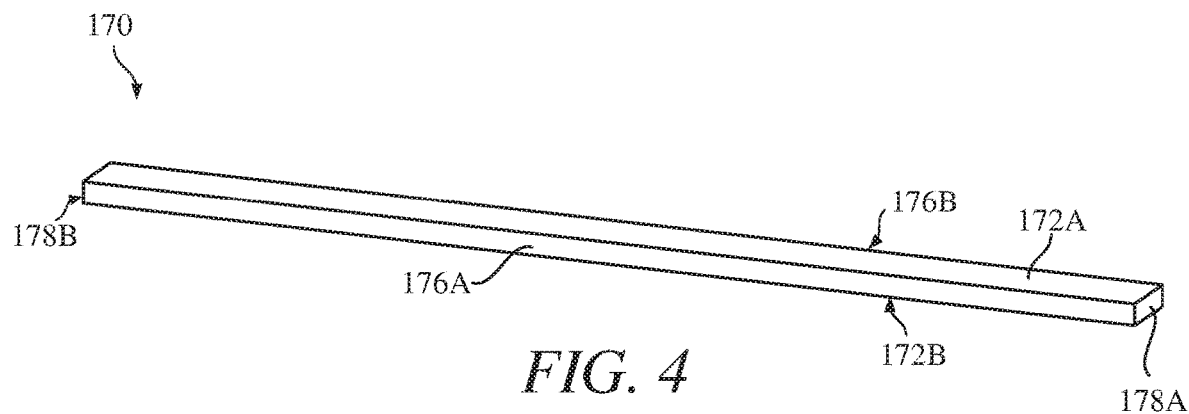
FIG. 4 is a perspective view of an exemplary foam layer for producing a facial-interface cushion for a head-mounted display.

In some embodiments, mold channel 154 may be sized and shaped to hold and form a foam layer (see, e.g., foam layer 170 illustrated in FIG. 4). Mold channel 154 may include various regions corresponding to regions of facial-interface cushion 126 molded within mold channel 154. For example, mold channel 154 may include a nasal region 155A that molds a portion of facial-interface cushion 126 dimensioned to abut and/or contact a nasal region of a user's face, cheek regions 155B that mold portions of facial-interface cushion 126 dimensioned to abut and/or contact cheek regions of a user's face, temple regions 155C that mold portions of facial-interface cushion 126 dimensioned to abut and/or contact temple regions of a user's face, and a forehead region 155D that molds a portion of facial-interface cushion 126 dimensioned to abut and/or contact a forehead region of a user's face.

As illustrated in FIG. 3, mold channel 154 may be defined by a channel bottom surface 156, which includes a surface of recessed mold member 150 disposed to a greatest depth within recessed mold member 150 relative to outer mold facing surface 152A and/or inner mold facing surface 152B. Mold channel 154 may also be defined by a channel inner side surface 158 and a channel peripheral side surface 160. Channel inner side surface 158 may define an inner portion of mold channel 154 following an inner portion of a looped path surrounding inner mold facing surface 152B and channel peripheral side surface 160 may define a peripheral portion of mold channel 154 following a periphery of the looped path surrounded by outer mold facing surface 152A.

In some embodiments, as shown in FIG. 3, mold channel 154 may also be defined by a channel raised surface 162 of recessed mold member 150 that is located at a shallower depth than channel bottom surface 156 relative to outer mold facing surface 152A and/or inner mold facing surface 152B. In some examples, channel raised surface 162 may define a portion of mold channel 154 in nasal region 155A. In this example, one or more portions of recessed mold member 150 may include channel inclined surfaces 167 sloping between ends of channel raised surface 162 and adjacent portions of channel bottom surface 156. In one embodiment, mold channel 154 may also be defined by one or more sloped surfaces extending between channel bottom surface 156 and channel inner side surface 158 and/or channel peripheral side surface 160. For example, as illustrated in FIG. 3, recessed mold member 150 may include channel sloped surfaces 168 extending between portions of channel bottom surface 156 and portions of channel inner side surface 158 and defining portions of temple regions 155C of mold channel 154.

In at least one embodiment, mold channel 154 may be defined by at least one curved surface arcing between channel bottom surface 156 and channel inner side surface 158, channel peripheral side surface 160, and/or channel sloped surface 168. For example, as illustrated in FIG. 3, a channel peripheral curved surface 164 may arc between channel bottom surface 156 and channel peripheral side surface 160. Additionally or alternatively, a channel inner curved surface 166 may arc between channel bottom surface 156 and channel inner side surface 158 and/or channel sloped surface 168. Channel peripheral curved surface 164 and/or channel inner curved surface 166 may extend respectively along peripheral and/or inner portions of channel bottom surface 156 defining cheek regions 155B, temple regions 155C, and/or forehead region 155D of mold channel 154. In some embodiments, channel peripheral curved surface 164 and/or channel inner curved surface 166 may also respectively extend along peripheral and/or inner portions of channel inclined surfaces 167 and/or channel raised surface 162 defining nasal region 155A of mold channel 154. As will be described in greater detail below, channel peripheral curved surface 164 and/or channel inner curved surface 166 may mold corresponding curved surfaces of molded facial-interface cushion 126 that are configured to abut and/or contact facial regions of a user.

In one embodiment, at least one alignment hole for aligning recessed mold member 150 with insertion mold member 130 may be defined within recessed mold member 150. For example, as illustrated in FIG. 3, a plurality of outer alignment holes 169A may be defined in recessed mold member 150 extending from outer mold facing surface 152A through at least a portion of recessed mold member 150. Additionally or alternatively, a plurality of inner alignment holes 169B may be defined in recessed mold member 150 extending from inner mold facing surface 152B through at least a portion of recessed mold member 150. One or more of outer alignment holes 169A and/or inner alignment holes 169B may, for example, extend at least partially through recessed mold member 150 in a thickness direction (e.g., a direction substantially perpendicular to outer mold facing surface 152A and/or inner mold facing surface 152B) from outer mold facing surface 152A and/or inner mold facing surface 152B toward a rear surface of recessed mold member 150 opposite outer mold facing surface 152A and/or inner mold facing surface 152B.

FIG. 4 is a perspective view showing an exemplary foam layer 170 for producing a facial-interface cushion 126 according to some embodiments. Foam layer 170 may include any material that is moldable into facial-interface cushion 126 in a mold assembly (e.g., mold assembly 131 illustrated in FIGS. 8-11) when exposed to elevated heat. In some embodiments, foam layer 170 may include a thermoplastic and/or thermosetting polymer material that softens and becomes pliable and/or moldable when heated above a specified temperature (e.g., a softening point) and that solidifies upon cooling. Foam layer 170 may, for example, maintain the shape shown in FIG. 4 at temperatures below the specified temperature. Foam layer 170 may include a resilient foam material that may be compressed and/or deformed when a force is applied, and that may return to its original shape when the force is removed. Upon heating above the specified temperature, intermolecular bonds within the material of foam layer 170 may weaken, allowing the material to take on a new shape. When the material is subsequently cooled, the material may harden and maintain the new shape.

In some embodiments, foam layer 170 may include a thermoplastic and/or thermosetting foam material that includes a foam structure defining numerous pockets having any suitable range of sizes prior to, during, and following molding. Foam layer 170 may, for example, include a polymeric foam material having a suitable degree of elasticity and conformability following molding, enabling molded facial-interface cushion 126 to conform to contours of a facial-interface mounting member 124 (see, e.g., FIG. 1) and to comfortably contact and/or conform to facial regions of a user. Examples of suitable thermoplastic and/or thermosetting polymer materials included in foam layer 170 may include, without limitation, polyurethanes, polyethylenes, ethyl vinyl acetates, polypropylenes, and/or polyesters. Thermoplastic and/or thermosetting polymer materials in foam layer 170 may also include one or more additives, including, for example, tackifiers, plasticizers, waxes, and/or stabilizers, without limitation. Foam layer 170 may include an open-cell or closed-cell foam. In one example, foam layer 170 may include an open-cell polyurethane foam material.

The specified temperature, above which a thermoplastic and/or thermosetting material softens and becomes pliable and/or moldable, may include any suitable temperature above a standard normal temperature of 20° C. (68° F.), without limitation. For example, a specified temperature (e.g., softening point) suitable for molding for one or more of the disclosed thermoplastic and/or thermosetting foam materials may be in a range from approximately 50° C. to approximately 500° C. (e.g., approximately 50° C. to approximately 60° C., approximately 60° C. to approximately 70° C., approximately 70° C. to approximately 80° C., approximately 80° C. to approximately 90° C., approximately 90° C. to approximately 100° C., approximately 100° C. to approximately 110° C., approximately 110° C. to approximately 120° C., approximately 120° C. to approximately 130° C., approximately 130° C. to approximately 140° C., approximately 140° C. to approximately 150° C., approximately 150° C. to approximately 160° C., approximately 160° C. to approximately 170° C., approximately 170° C. to approximately 180° C., approximately 190° C. to approximately 200° C., approximately 200° C. to approximately 210° C., approximately 210° C. to approximately 220° C., approximately 220° C. to approximately 230° C., approximately 230° C. to approximately 240° C., approximately 240° C. to approximately 250° C., approximately 250° C. to approximately 260° C., approximately 260° C. to approximately 270° C., approximately 270° C. to approximately 280° C., approximately 280° C. to approximately 290° C., approximately 290° C. to approximately 300° C., approximately 300° C. to approximately 350° C., approximately 350° C. to approximately 400° C., approximately 400° C. to approximately 450° C., and/or approximately 450° C. to approximately 500° C.).

In some embodiments, a thermoplastic and/or thermosetting foam material of foam layer 170 may be heated at and/or to a temperature within a predetermined range of temperatures during molding. Foam layer 170 may, for example, be heated above a specified temperature allowing for softening of foam layer 170 and below a temperature at which foam layer 170 may begin to melt and/or otherwise lose its structural integrity. In some examples, adjacent portions of foam layer 170 may become bonded to each other when heated above the specified temperature. For example, adjacent portions, such as overlapped end portions, of foam layer 170 may be bonded to each other during molding. In at least one example, compressing adjacent portions of foam layer 170 against each other with sufficient force during molding may increase a bond strength between the adjacent portions, as will be described in greater detail below in reference to FIGS. 8-11. In some examples, a thermoplastic open-cell polyurethane foam layer may be heated at a temperature in a range of between approximately 150° C. and approximately 175° C. during molding.

In at least one embodiment, foam layer 170 may be cut from a larger layer and/or otherwise formed prior to molding into facial-interface cushion 126. For example, foam layer 170 may be cut (e.g., die cut) from a larger foam sheet (see, e.g., FIG. 6). In one embodiment, foam layer 170 may additionally or alternatively be cut following molding to trim away selected portions. Foam layer 170 may be any suitable size, shape, and/or thickness. As shown, for example, in FIG. 4, foam layer 170 may be a strip of foam material that includes a longitudinally extending layer upper surface 172A and a longitudinally extending layer lower surface 172B opposite layer upper surface 172A. Foam layer 170 may also include a longitudinally extending first layer side surface 176A and a longitudinally extending second layer side surface 176B between layer upper surface 172A and layer lower surface 172B. Additionally, foam layer 170 may have a first layer end surface 178A at one end and a second layer end surface 178B at an opposite end. In some examples, foam layer 170 may have a substantially constant thickness over its length and width.

According to at least one embodiment, foam layer 170 may be dimensioned to fit within mold channel 154 of recessed mold member 150 shown in FIG. 3. For example, foam layer 170 may have a strip shape that may be conformed to an arcuate and/or looped path that generally or substantially matches a path followed by mold channel 154 shown in FIG. 3. In some examples, foam layer 170 may be shaped to fit within at least a portion of mold channel 154 adjacent to outer mold facing surface 152A and/or inner mold facing surface 152B. In one example, foam layer 170 may have a width that is larger than a portion of mold channel 154 adjacent to outer mold facing surface 152A and/or inner mold facing surface 152B of recessed mold member 150 such that at least a portion of foam layer 170 rests on outer mold facing surface 152A and/or inner mold facing surface 152B when foam layer is loaded onto recessed mold member 150.

Figure 5:
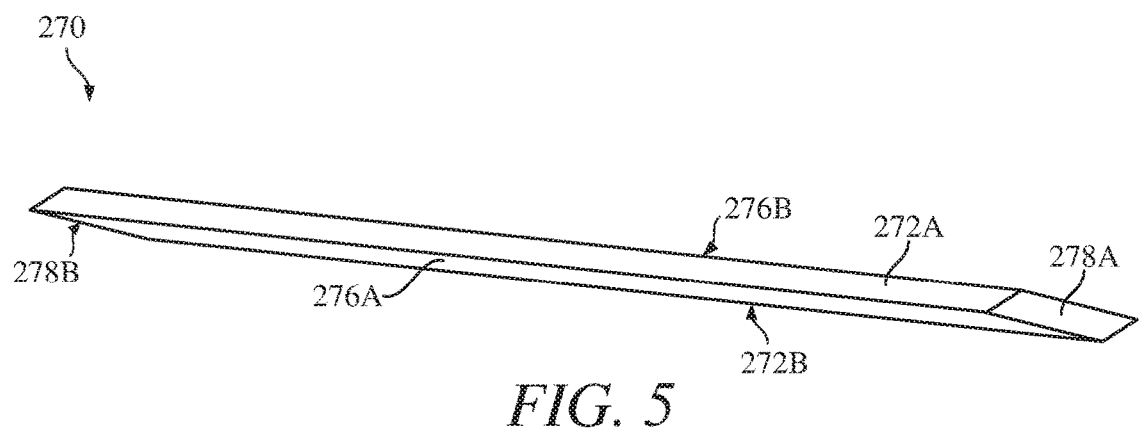
FIG. 5 is a perspective view of an exemplary foam layer for producing a facial-interface cushion for a head-mounted display.

FIG. 5 is a perspective view showing an exemplary foam layer 270 for producing a facial-interface cushion (see, e.g., facial-interface cushion 226 shown in FIG. 15) according to some embodiments. As with foam layer 170 illustrated in FIG. 4, foam layer 270 shown in FIG. 5 may be cut from a larger layer and/or otherwise formed prior to molding into a facial-interface cushion. For example, foam layer 270 may be cut (e.g., die cut) from a larger foam sheet (see, e.g., FIG. 6). As shown in FIG. 5, foam layer 270 may be a strip of foam material that includes a longitudinally extending layer upper surface 272A and a longitudinally extending layer lower surface 272B opposite layer upper surface 272A. Foam layer 270 may also include a longitudinally extending first layer side surface 276A and a longitudinally extending second layer side surface 276B between layer upper surface 272A and layer lower surface 272B. Additionally, foam layer 270 may have a first layer end surface 278A at one end and a second layer end surface 278B at an opposite end. First layer end surface 278A and/or second layer end surface 278B may be sloped surfaces that intersect layer upper surface 272A and/or layer lower surface 272B at an oblique angle. First layer end surface 278A may, for example, be configured to at least partially contact and overlap second layer end surface 278B when foam layer 270 is disposed with a mold assembly. In at least one example, first layer end surface 278A and/or second layer end surface 278B may be formed in a sheet from which foam layer 270 is cut.

Figure 6:
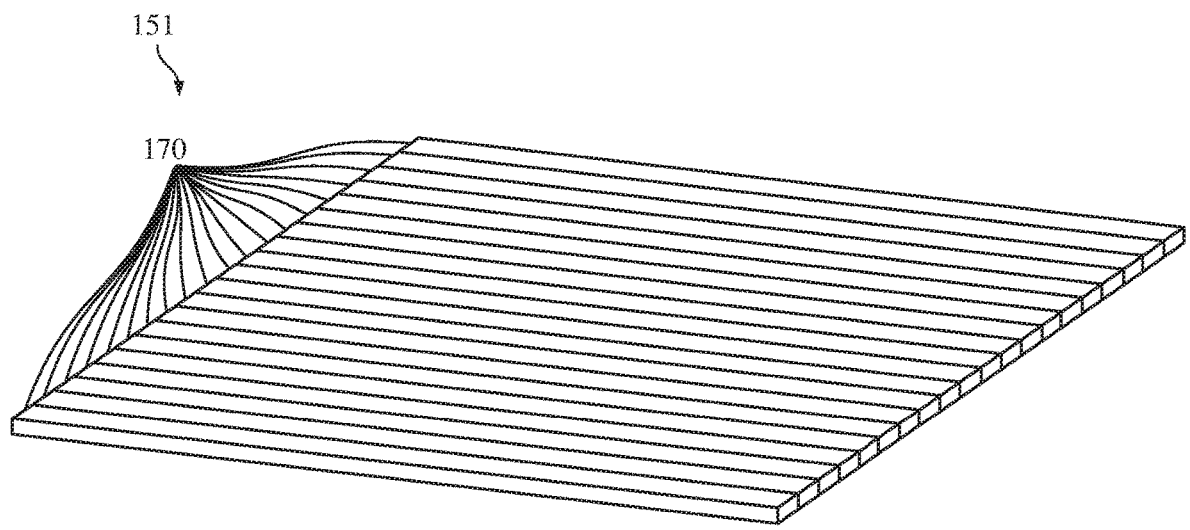
FIG. 6 is a perspective view of an exemplary foam sheet cut into a plurality of foam layers.

FIG. 6 is a perspective view illustrating a foam sheet 151 that is cut into a plurality of strip-shaped foam layers 170. As shown in FIG. 6, adjacent portions of a single foam sheet 151 may be cut into multiple foam layers 170. Any suitable cutting technique, (e.g., die-cutting, hot wire cutting, hot knife cutting, etc.) may be used to cut foam layers 170 from foam sheet 151, without limitation. Additionally, multiple strip-shaped foam layers 170 may be cut simultaneously or sequentially from foam sheet 151. In contrast to conventional methods for cutting and/or forming facial-interface cushions, which may generate substantial amounts of foam waste while cutting arcuate and/or looped foam layer portions from foam sheets, foam layers 170 may be cut from adjacent and/or parallel sections of foam sheet 151, resulting in the generation of comparatively little or no foam waste during cutting.

Figure 7:
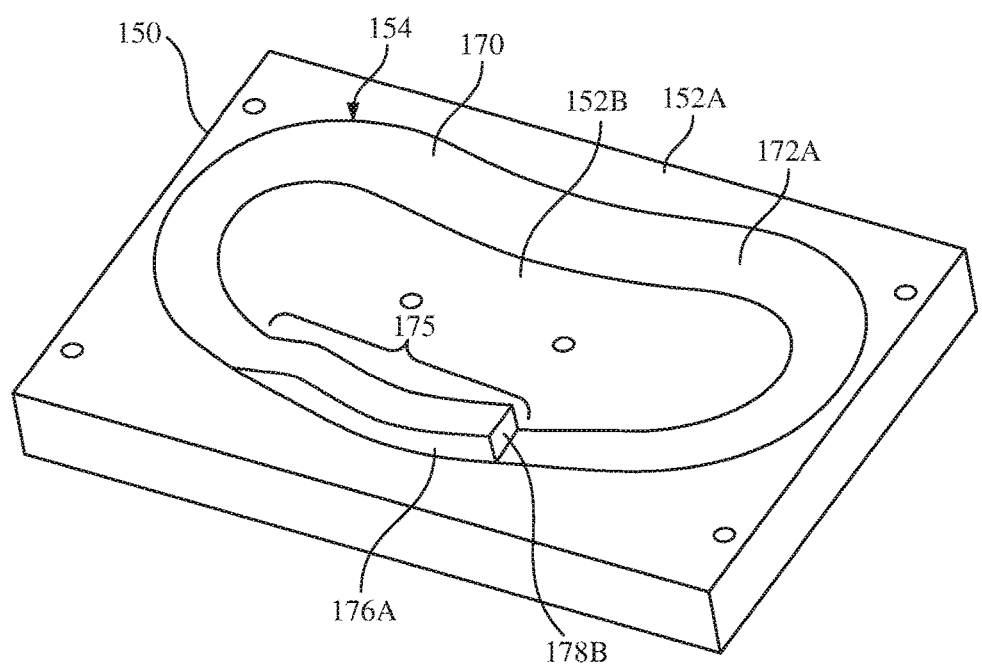
FIG. 7 is a perspective view of an exemplary foam layer positioned in a recessed mold member of a mold assembly for manufacturing a facial-interface cushion.

FIG. 7 is a perspective view of foam layer 170 positioned at least partially within mold channel 154 defined in recessed mold member 150. As shown in FIG. 7, strip-shaped foam layer 170 may be placed in mold channel 154 so as to extend along an arcuate and/or looped path followed by mold channel 154. For example, foam layer 170 may be positioned within mold channel 154 such that layer upper surface 172A faces outward from mold channel 154. In some embodiments, end regions of foam layer 170 may overlap each other in at least a portion of mold channel 154. For example, end regions of foam layer 170, such as end regions adjacent to and including first layer end surface 178A and/or second layer end surface 178B, may overlap each other in overlapped region 175. In some examples, overlapped region 175 of foam layer 170 may be disposed in and/or overlap at least a portion of nasal region 155A of mold channel 154 (see, e.g., nasal region 155A shown in FIG. 3).

Figure 8:
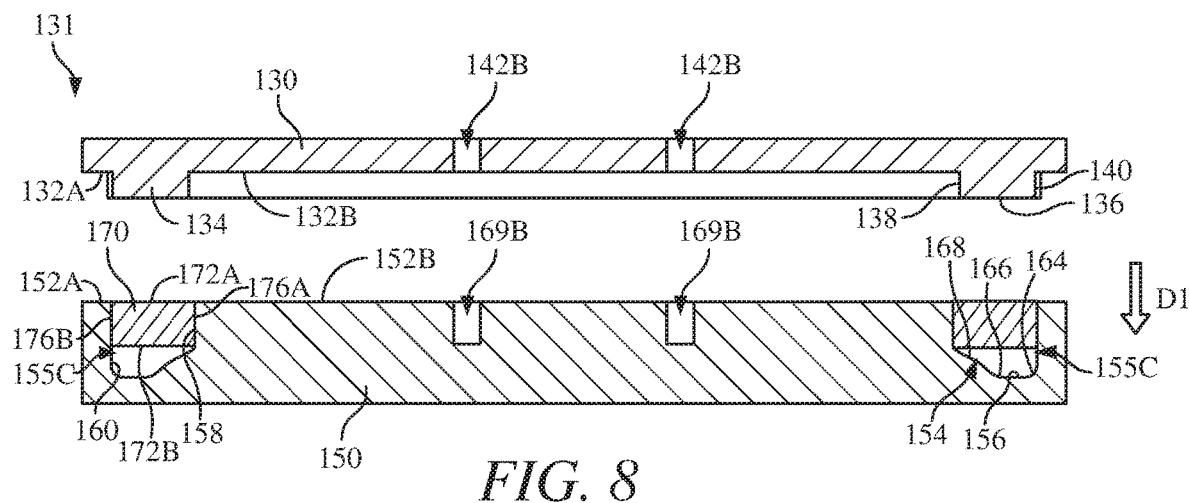
FIG. 8 is a cross-sectional view of a foam layer positioned in an exemplary mold assembly for manufacturing a facial-interface cushion.
Figure 9:
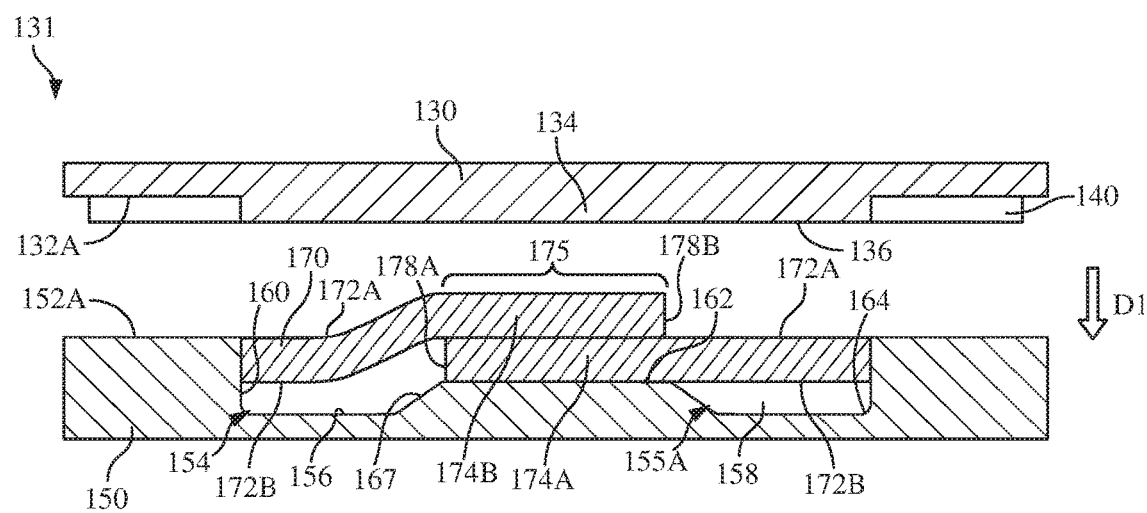
FIG. 9 is a cross-sectional view of a foam layer positioned in an exemplary mold assembly for manufacturing a facial-interface cushion.

FIGS. 8-11 are cross-sectional views illustrating a mold assembly 131 for molding foam layer 170 into facial-interface cushion 126 in accordance with some embodiments. As shown in FIGS. 8 and 9, foam layer 170 may be loaded between insertion mold member 130 and recessed mold member 150. For example, as shown in FIGS. 8 and 9, foam layer 170 may be placed within at least a portion of mold channel 154 defined in recessed mold member 150, such as a portion of mold channel 154 adjacent to outer mold facing surface 152A and/or inner mold facing surface 152B. In some examples, layer lower surface 172B of foam layer 170 may face toward channel bottom surface 156 of recessed mold member 150 and layer upper surface 172A of foam layer 170 may face away from channel bottom surface 156. First layer side surface 176A of foam layer 170 may face channel inner side surface 158 of recessed mold member 150 and second layer side surface 176B of foam layer 170 may face channel peripheral side surface 160 of recessed mold member 150. In some embodiments, foam layer 170 may not be disposed in mold channel 154 in the manner illustrated in FIGS. 8 and 9. For example, at least a portion of foam layer 170 may protrude from mold channel 154 and/or may be disposed on outer mold facing surface 152A and/or inner mold facing surface 152B. Additionally or alternatively, one or more portions of foam layer 170 may be angled, at least partially folded, and/or otherwise deformed within mold channel 154.

As shown in FIG. 9, overlapped region 175 of foam layer 170 may be at least partially disposed in mold channel 154. Overlapped region 175 may include a first end portion 174A and a second end portion 174B overlapping first end portion 174A. For example, second end portion 174B adjacent to and/or including second layer end surface 178B may overlap first end portion 174A adjacent to and/or including first layer end surface 178A such that layer lower surface 172B of second end portion 174B abuts and/or contacts layer upper surface 172A of first end portion 174A. In some embodiments, first end portion 174A may directly contact second end portion 174B. In at least one embodiment, a layer, such as an adhesive layer (e.g., a hot-melt adhesive, etc.) for bonding first end portion 174A to second end portion 174B may be disposed between at least part of first end portion 174A and second end portion 174B.

In some embodiments, overlapped region 175 of foam layer 170 may be disposed in a portion of mold channel 154 shaped to form a region of facial-interface cushion 126 configured to abut a nasal region of a user's face. For example, overlapped region 175 of foam layer 170 may be disposed in nasal region 155A of mold channel 154. In at least one embodiment, overlapped region 175 may be disposed on channel raised surface 162 of recessed mold member 150. Channel raised surface 162 may be shaped to form a portion of facial-interface cushion 126 having a reduced thickness relative to other portions of facial-interface cushion 126 formed within other regions of mold channel 154. In some embodiments, first end portion 174A may be disposed on channel raised surface 162 and second end portion 174B may be disposed on first end portion 174A between first end portion 174A and protruding portion 134 of insertion mold member 130, as shown in FIG. 9. In at least one example, second end portion 174B may be disposed on channel raised surface 162 and first end portion 174A may be disposed on second end portion 174B between second end portion 174B and protruding portion 134.

According to some embodiments, insertion mold member 130 and/or recessed mold member 150 may be heated prior to loading foam layer 170 into mold channel 154 and/or between insertion mold member 130 and recessed mold member 150. For example, insertion mold member 130 and/or recessed mold member 150 may be pre-heated to an elevated temperature at or above a specified temperature (e.g., a softening point) for softening foam layer 170. In at least one embodiment, insertion mold member 130 and/or recessed mold member 150 may be maintained at the elevated temperature during molding. In some examples, insertion mold member 130 and/or recessed mold member 150 may be pre-heated to the elevated temperature but may not be further heated during molding. In some embodiments, foam layer 170 may be heated separately from insertion mold member 130 and/or recessed mold member 150 prior to loading foam layer 170 into mold assembly 131. For example, foam layer 170 may be heated to an elevated temperature at or above the specified temperature to soften foam layer 170, after which foam layer 170 may be loaded into mold assembly 131 with or without further heating from insertion mold member 130 and/or recessed mold member 150. In one embodiment, mold assembly 131 may be disposed within a heated vessel to heat mold assembly 131 and foam layer 170 during molding.

Once foam layer 170 is loaded into mold assembly 131, insertion mold member 130 may be moved toward recessed mold member 150 and foam layer 170 in direction D1 shown in FIGS. 8-11. Although not illustrated in FIGS. 8-11, guides, such as alignment pins, may be disposed within outer alignment holes 142A and/or inner alignment holes 142B defined in insertion mold member 130 and within corresponding outer alignment holes 169A and/or inner alignment holes 169B defined in recessed mold member 150 to guide and/or hold insertion mold member 130 in proper alignment with recessed mold member 150.

Figure 10:
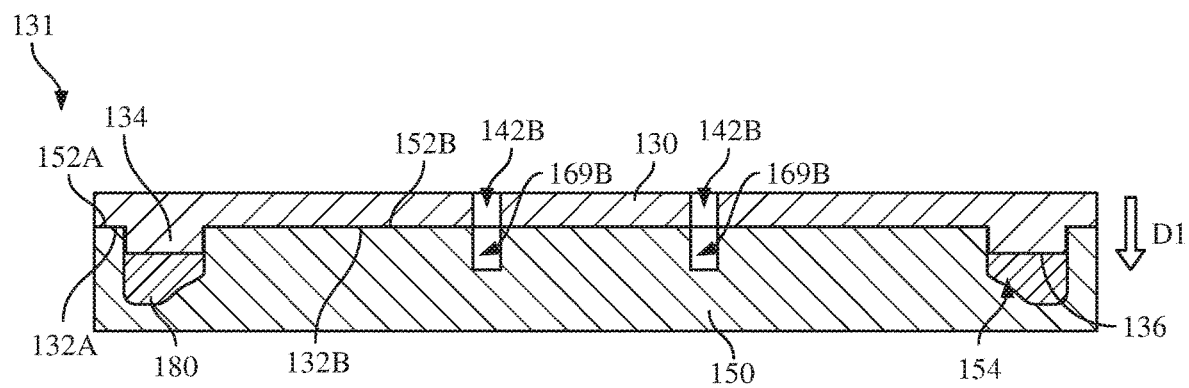
FIG. 10 is a cross-sectional view of a shaped foam element disposed in an exemplary mold assembly for manufacturing a facial-interface cushion.
Figure 11:
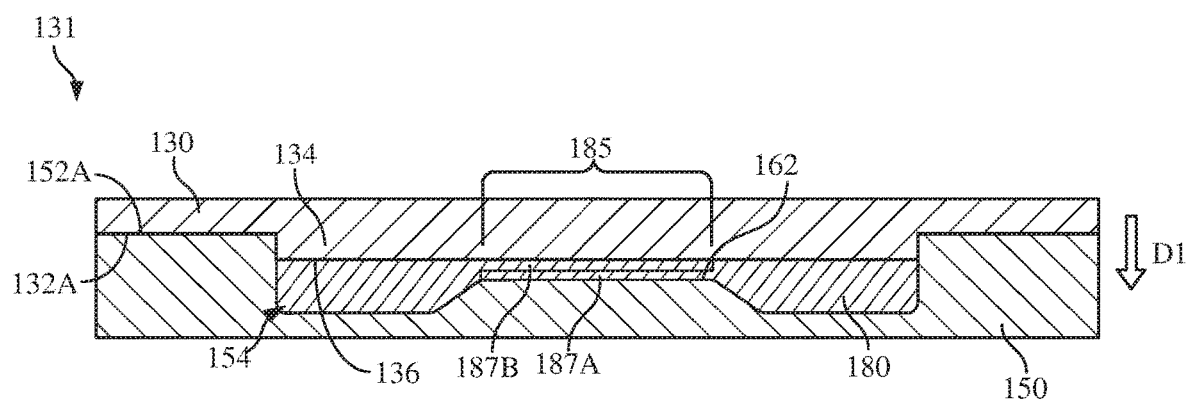
FIG. 11 is a cross-sectional view of a shaped foam element disposed in an exemplary mold assembly for manufacturing a facial-interface cushion.

As illustrated in FIGS. 10 and 11, insertion mold member 130 may be moved in direction D1 until insertion mold member 130 abuts and/or contacts recessed mold member 150. For example, as shown in FIGS. 10 and 11, outer mold facing surface 132A and inner mold facing surface 132B of insertion mold member 130 may respectively be disposed adjacent to and/or abutting outer mold facing surface 152A and inner mold facing surface 152B of recessed mold member 150. In this example, protruding portion 134 of insertion mold member 130 may be disposed within a portion of mold channel 154 such that protrusion inner side surface 138 and protrusion peripheral side surface 140 are respectively disposed adjacent to and/or abutting channel inner side surface 158 and channel peripheral side surface 160 of recessed mold member 150. In some embodiments, protruding portion 134 of insertion mold member 130 may be dimensioned so that a sufficient amount of space exists between protrusion inner side surface 138 and channel inner side surface 158 and/or between protrusion peripheral side surface 140 and channel peripheral side surface 160 to allow for gasses, such as air, to be evacuated from mold channel 154 as foam layer 170 is pushed into mold channel 154 by protruding portion 134 of insertion mold member 130. In some embodiments, holes may be defined in at least a portion of recessed mold member 150 (e.g., a portion adjacent to mold channel 154) and/or in at least a portion of insertion mold member 130 (e.g., within protruding portion 134) to allow for evacuation of gasses within mold channel 154.

As protruding portion 134 of insertion mold member 130 is inserted into mold channel 154 defined in recessed mold member 150, protrusion end surface 136 of protruding portion 134 may force foam layer 170 into mold channel 154 toward channel bottom surface 156. As foam layer 170 is forced into mold channel 154 by protruding portion 134, foam layer 170 may contact and conform to various surfaces of recessed mold member 150 defining mold channel 154, forming a shaped foam element 180. As illustrated, for example, in FIGS. 10 and 11, shaped foam element 180 may contact at least a portion of channel bottom surface 156, channel inner side surface 158, channel peripheral side surface 160, channel peripheral curved surface 164, channel inner curved surface 166, and/or channel sloped surface 168. Additionally, shaped foam element 180 may contact at least a portion of channel raised surface 162 and/or channel inclined surfaces 167. Shaped foam element 180, which is heated to soften the foam material, may conform to and assume a shape corresponding to surfaces of recessed mold member 150 and insertion mold member 130 contacting shaped foam element 180.

In some embodiments, as shown in FIG. 11, shaped foam element 180 may include an overlapped region 185 corresponding to overlapped region 175 of foam layer 170 shown in FIG. 9. Overlapped region 185 may be compressed between protrusion end surface 136 of insertion mold member 130 and channel raised surface 162 of recessed mold member 150. Overlapped region 185 of shaped foam element 180 may include a first end portion 187A corresponding to first end portion 174A of foam layer 170 and a second end portion 187B corresponding to second end portion 174B of foam layer 170. As shown in FIG. 11, first end portion 187A may be compressed against second end portion 187B. Overlapped region 185 may have a reduced thickness between protrusion end surface 136 of insertion mold member 130 and channel raised surface 162 of recessed mold member 150 relative to other regions of shaped foam element 180. As such, first end portion 187A may be compressed against second end portion 187B with a force that exceeds forces applied to other portions of shaped foam element 180 disposed between insertion mold member 130 and recessed mold member 150. Such increased force applied to first end portion 187A and second end portion 187B in overlapped region 185 may facilitate bonding of first end portion 187A to second end portion 187B during molding of shaped foam element 180 to form facial-interface cushion 126.

Shaped foam element 180 may be held between insertion mold member 130 and recessed mold member 150 for an amount of time sufficient to enable shaped foam element 180 to be fully molded to the contacted surfaces of recessed mold member 150 and insertion mold member 130, thereby forming facial-interface cushion 126. Additionally, shaped foam element 180 may be held between insertion mold member 130 and recessed mold member 150 for an amount of time sufficient to enable first end portion 187A to be bonded to second end portion 187B in overlapped region 185. For example, shaped foam element 180 may be held between insertion mold member 130 and recessed mold member 150, as shown in FIGS. 10 and 11, for a time period of from approximately 10 sec to approximately 10 min or more (e.g., approximately 10 sec to approximately 20 sec, approximately 20 sec to approximately 30 sec, approximately 30 sec to approximately 40 sec, approximately 40 sec to approximately 50 sec, approximately 50 sec to approximately 60 sec, approximately 60 sec to approximately 70 sec, approximately 70 sec to approximately 80 sec, approximately 80 sec to approximately 90 sec, approximately 90 sec to approximately 100 sec, approximately 100 sec to approximately 110 sec, approximately 110 sec to approximately 120 sec, approximately 2 min to approximately 2.5 min, approximately 2.5 min to approximately 3 min, approximately 3 min to approximately 3.5 min, approximately 3.5 min to approximately 4 min, approximately 4 min to approximately 4.5 min, approximately 4.5 min to approximately 5 min, approximately 5 min to approximately 6 min, approximately 6 min to approximately 7 min, approximately 7 min to approximately 8 min, approximately 8 min to approximately 9 min, approximately 9 min to approximately 10 min). In some embodiments, shaped foam element 180 may be heated and molded in mold assembly 131 for a time period within a predetermined range of time periods. For example, shaped foam element 180 may include a thermoplastic open-cell polyurethane foam that may be heated and molded for a time period in a range of between approximately 30 sec and approximately 2 min.

In some embodiments, shaped foam element 180 may be subjected to increased pressure during heating and/or molding. For example, shaped foam element 180 may be subjected to a pressure within a predetermined range of pressures above a standard normal pressure of 1 atm (14.696 psi, 101.325 kPa). For example, one or more of the disclosed thermoplastic and/or thermosetting foam materials may subjected, during heating and/or molding, to an elevated pressure in a range from approximately 20 PSI to approximately 200 PSI (e.g., approximately 20 PSI to approximately 30 PSI, approximately 30 PSI to approximately 40 PSI, approximately 40 PSI to approximately 50 PSI, approximately 50 PSI to approximately 60 PSI, approximately 60 PSI to approximately 70 PSI, approximately 70 PSI to approximately 80 PSI, approximately 80 PSI to approximately 90 PSI, approximately 90 PSI to approximately 100 PSI, approximately 100 PSI to approximately 150 PSI, and/or approximately 150 PSI to approximately 200 PSI).

After shaped foam element 180 has been held within mold assembly 131 for a suitable period of time to form facial-interface cushion 126, insertion mold member 130 may be separated from recessed mold member 150 and molded facial-interface cushion 126 may be removed from mold assembly 131. According to some embodiments, facial-interface cushion 126 may be removed from mold assembly 131 and allowed to cool outside of mold assembly 131. For example, facial-interface cushion 126 may be removed from mold channel 154 defined in recessed mold member 150 and cooled to a temperature below the specified temperature (e.g., softening point) to allow facial-interface cushion 126 to solidify and maintain the molded shape. Additionally or alternatively, facial-interface cushion 126 may be at least partially cooled within recessed mold member 150 prior to removing facial-interface cushion 126 from mold assembly 131.

Figure 12:
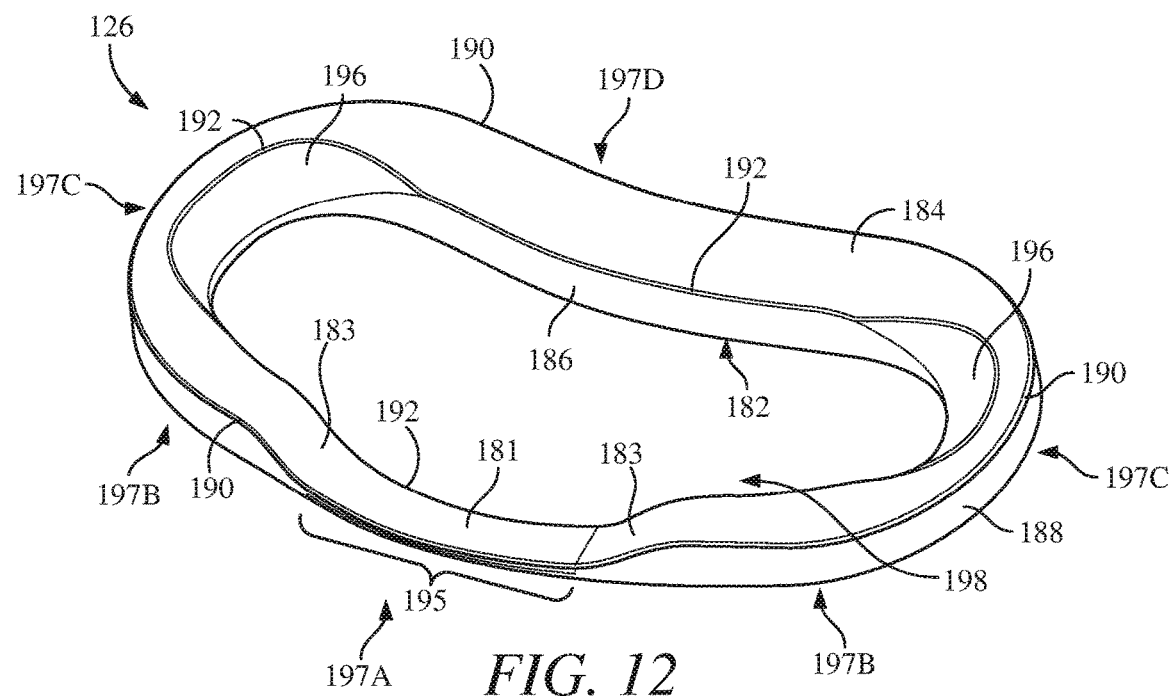
FIG. 12 is a perspective view of an exemplary facial-interface cushion for a head-mounted display.
Figure 13:
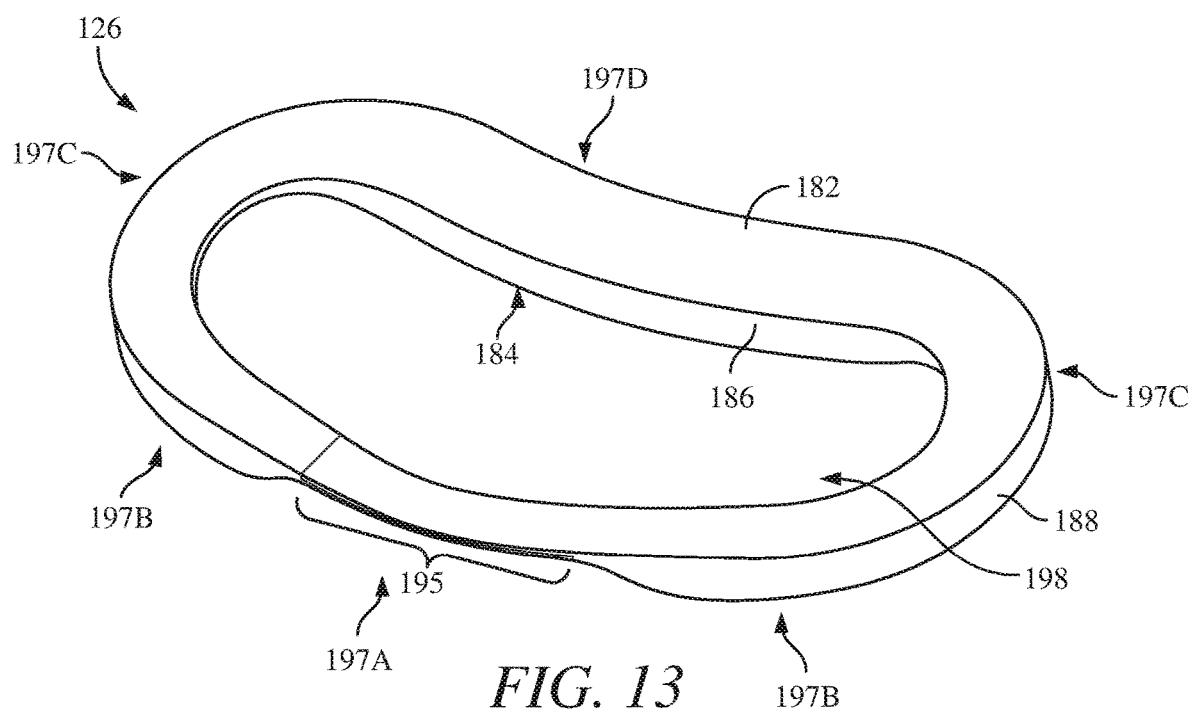
FIG. 13 is a perspective view of an exemplary facial-interface cushion for a head-mounted display.
Figure 14:
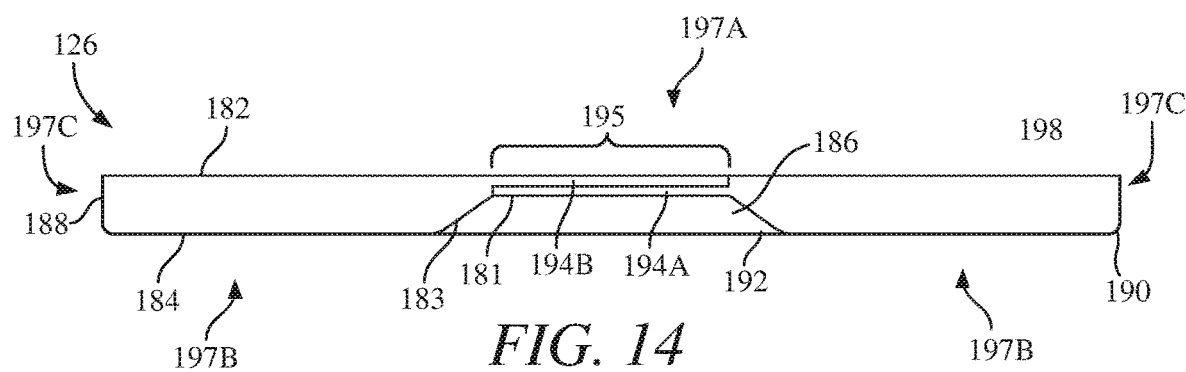
FIG. 14 is a side view of an exemplary facial-interface cushion for a head-mounted display.

FIGS. 12-14 show a facial-interface cushion 126 molded by mold assembly 131 according to some embodiments. While the features shown in FIGS. 12-14 are illustrated in relation to facial-interface cushion 126, corresponding features may be present on shaped foam element 180 disposed within mold assembly 131 as shown in FIGS. 10 and 11.

Facial-interface cushion 126 may include various regions dimensioned to abut and/or conform to selected portions of a user's face when head-mounted-display system 100 shown in FIG. 1 is worn by the user. For example, as shown in FIGS. 12-14, facial-interface cushion 126 may include a cushion nasal region 197A corresponding to a nasal region of the user's face, cushion cheek regions 197B corresponding to cheek regions of the user's face, cushion temple regions 197C corresponding to temple regions of the user's face, and a cushion forehead region 197D corresponding to a forehead region of the user's face. In some embodiments, a portion of facial-interface cushion 126 in cushion nasal region 197A may be thinner than other portions of facial-interface cushion 126.

Facial-interface cushion 126 may include a cushion display-side surface 182 that is dimensioned to abut mounting surface 125 of facial-interface mounting member 124 shown in FIG. 1. Cushion display-side surface 182 may be formed by protrusion end surface 136 of protruding portion 134 of insertion mold member 130 during molding and may have any suitable shape, size, and configuration. In some embodiments, cushion display-side surface 182 may be a generally flat and/or planar surface prior to mounting facial-interface cushion 126 to facial-interface mounting member 124. In at least one embodiment, one or more recesses, such as a foam channel, may be defined in facial-interface cushion 126 extending from cushion display-side surface 182. Cushion display-side surface 182 may be coupled to facial-interface mounting member 124 in any suitable manner. For example, cushion display-side surface 182 may be bonded, mechanically attached, and/or magnetically attached to a corresponding portion, such as mounting surface 125, of facial-interface mounting member 124.

Facial-interface cushion 126 may also include a cushion user-side surface 184 dimensioned to abut a facial portion of a user when head-mounted-display system 100 is worn by the user. For example, cushion user-side surface 184 may be configured to contact and/or conform to at least a portion of the user's nasal, cheek, temple, and/or forehead facial regions. Cushion user-side surface 184 may be formed by channel bottom surface 156 of recessed mold member 150 during molding and may have any suitable shape, size, and configuration. In some embodiments, cushion user-side surface 184 may be a generally flat and/or planar surface prior to mounting facial-interface cushion 126 to facial-interface mounting member 124. Cushion user-side surface 184 may also include any other suitable surface shape, such as a generally arcuate surface and/or otherwise non-planar surface, without limitation.

According to some embodiments, facial-interface cushion 126 may include a cushion inner side surface 186 and a cushion peripheral side surface 188 extending from cushion display-side surface 182 and/or extending between cushion display-side surface 182 and cushion user-side surface 184 in a thickness direction of facial-interface cushion 126. Cushion inner side surface 186 and cushion peripheral side surface 188 may be respectively formed by channel inner side surface 158 and channel peripheral side surface 160 of recessed mold member 150 during molding and may have any suitable shape, size, and configuration. In some embodiments, cushion inner side surface 186 and/or a cushion peripheral side surface 188 may extend in a direction substantially perpendicular to at least a portion of cushion display-side surface 182 and/or cushion user-side surface 184. Additionally or alternatively, cushion inner side surface 186 and/or a cushion peripheral side surface 188 may extend in any other suitable direction, without limitation. As shown in FIGS. 12 and 13, cushion inner side surface 186 may define a viewing opening 198 extending through facial-interface cushion 126. Viewing opening 198 may correspond to, for example, viewing region 122 illustrated in FIG. 1. Viewing opening 198 may be sized to surround the eyes and adjacent portions of a user's face so as to not interfere with the user's view of lenses 104 shown in FIG. 1.

In at least one embodiment, facial-interface cushion 126 may include at least one cushion sloped surface 196 extending between at least a portion of cushion user-side surface 184 and/or cushion inner side surface 186 and at least a portion of cushion inner side surface 186 and/or cushion display-side surface 182. For example, as shown in FIG. 12, facial-interface cushion 126 may include a cushion sloped surface 196 in each of cushion temple regions 197C. In some embodiments, cushion sloped surfaces 196 may slope away from temple, cheek, and/or forehead regions of a user's face when facial-interface cushion 126 is positioned against the user's face while the user is wearing head-mounted-display system 100. As such, cushion sloped surfaces 196 may each define a gap between portions of the user's face and facial-interface cushion 126, accommodating, for example, accessories, such as eyeglasses worn by the user. Additionally, cushion sloped surfaces 196 may decrease an overall surface area of facial-interface cushion 126 contacting the user's face, thereby decreasing an amount of heat built up between the user's face and facial-interface cushion 126. Additionally, because an overall width of facial-interface cushion 126 is not decreased in regions overlapping cushion sloped surfaces 196 (e.g., in cushion temple regions 197C), structural integrity of facial-interface cushion 126 may be maintained in these regions. Additionally, sloped surfaces 196 may be formed on facial-interface cushion 126 without sacrificing an area of cushion display-side surface 182 overlapping cushion sloped surfaces 196, thereby maintaining a substantial surface area available for attaching (e.g., bonding) and/or otherwise securing cushion display-side surface 182 to facial-interface mounting member 124 shown in FIG. 1.

According to at least one embodiment, as shown in FIGS. 12-14, facial-interface cushion 126 may include an overlapped region 195 including a first end portion 194A corresponding to first end portion 174A of foam layer 170 and a second end portion 194B corresponding to second end portion 174B of foam layer 170. First end portion 194A may be bonded to second end portion 194B. Overlapped region 195 may form at least a portion of a cushion recessed surface 181 in cushion nasal region 197A. Cushion recessed surface 181 may be formed by channel raised surface 162 of recessed mold member 150 during molding and may have any suitable shape, size, and configuration. A portion of facial-interface cushion 126 between cushion recessed surface 181 and cushion display-side surface 182 may be thinner than other portions of facial-interface cushion 126 between cushion user-side surface 184 and cushion display-side surface 182. Because facial-interface cushion 126 is thinner in cushion nasal region 197A at cushion recessed surface 181, cushion nasal region 197A may be readily bent and conformed to mounting surface 125 of facial-interface mounting member 124 configured to surround a portion of the user's nasal region, as shown in FIG. 1. In order to surround the nasal region of the user's face, cushion nasal region 197A and corresponding regions of facial-interface mounting member 124 may have more pronounced surface variations in facial-interface system 120 than other portions of facial-interface cushion 126 and facial-interface mounting member 124. Additionally, the thinner cushion nasal region 197A of facial-interface cushion may reduce the profile of facial-interface cushion 126, and may likewise reduce the profile of facial-interface system 120, adjacent to the user's nasal region, allowing facial-interface system 120 to be produced with a smaller overall footprint.

Facial-interface cushion 126 may also include cushion inclined surfaces 183 sloping from cushion recessed surface 181 to adjacent portions of cushion user-side surface 184. Cushion inclined surfaces 183 may be formed by channel inclined surfaces 167 of recessed mold member 150 during molding. In some embodiments, portions of cushion inner side surface 186 and cushion peripheral side surface 188 may extend between cushion display-side surface 182 and one or more of cushion sloped surfaces 196, cushion recessed surface 181, and/or cushion inclined surfaces 183 in a thickness direction of facial-interface cushion 126, as illustrated in FIGS. 12 and 14. In some embodiments, facial-interface cushion 126 may include one or more additional or alternative surfaces sloping between at least a portion of cushion user-side surface 184 and at least one of cushion inner side surface 186 and/or cushion peripheral side surface 188. Additionally or alternatively, facial-interface cushion 126 may include one or more surfaces sloping between at least a portion of cushion display-side surface 182 and at least one of cushion inner side surface 186 and/or cushion peripheral side surface 188.

According to some embodiments, facial-interface cushion 126 may include a cushion peripheral curved surface 190 and/or a cushion inner curved surface 192, each arcing from at least a portion of cushion user-side surface 184 toward cushion display-side surface 182. For example, cushion peripheral curved surface 190 may arc between at least a peripheral side of cushion user-side surface 184 and at least a portion of cushion peripheral side surface 188, as shown in FIGS. 12 and 14. In at least one example, cushion peripheral curved surface 190 may additionally or alternatively arc between at least a peripheral side portion of cushion recessed surface 181 and/or cushion inclined surfaces 183 and at least a portion of cushion peripheral side surface 188. In at least one embodiment, as shown in FIG. 12, cushion peripheral curved surface 190 may be formed around a substantial or entire peripheral portion of facial-interface cushion 126, including peripheral portions of facial-interface cushion 126 in cushion nasal region 197A, cushion cheek regions 197B, cushion temple regions 197C, and cushion forehead region 197D.

Cushion inner curved surface 192 may arc between at least an inner side of cushion user-side surface 184 surrounding viewing opening 198 and at least a portion of cushion inner side surface 186, as shown in FIGS. 12 and 14. In at least one example, cushion inner curved surface 192 may additionally or alternatively arc between at least an inner side portion of cushion recessed surface 181 and/or cushion inclined surfaces 183 surrounding viewing opening 198 and at least a portion of cushion inner side surface 186. Additionally or alternatively, cushion inner curved surface 192 may arc between at least an inner side portion of cushion user-side surface 184 and one or more portions of cushion sloped surfaces 196. In at least one embodiment, as shown in FIG. 12, cushion inner curved surface 192 may be formed around a substantial or entire inner portion of facial-interface cushion 126 surrounding viewing opening 198, including inner portions of facial-interface cushion 126 in cushion nasal region 197A, cushion cheek regions 197B, cushion temple regions 197C, and cushion forehead region 197D. Cushion inner curved surface 192 may define a portion of viewing opening 198. In some embodiments, at least a portion of cushion peripheral curved surface 190 and/or cushion inner curved surface 192 may arc between at least a portion of cushion user-side surface 184, cushion recessed surface 181, and/or cushion inclined surface 183 and at least a portion of cushion display-side surface 182.

Cushion peripheral curved surface 190 and/or cushion inner curved surface 192 may contact portions of a user's face at inner and peripheral regions of cushion user-side surface 184, cushion recessed surface 181, and/or cushion inclined surface 183 when head-mounted-display system 100 is worn by the user. Advantageously, cushion peripheral curved surface 190 and/or cushion inner curved surface 192 may comfortably contact nasal, cheek, temple, and/or forehead regions of the user's face without adding bulk to facial-interface system 120. For example, in contrast to conventional facial-interface cushions having angular edges at peripheral and inner regions of the cushions, which may increase and concentrate pressure at corresponding user facial regions resulting in user discomfort and leaving residual marks and/or indentations on users' skin, cushion peripheral curved surface 190 and/or cushion inner curved surface 192 of facial-interface cushion 126 may better distribute pressure at regions contacting a user's face. Accordingly, cushion peripheral curved surface 190 and/or cushion inner curved surface 192 may contact the user's face in a more comfortable manner that reduces discomfort and prevents formation of residual marks and/or indentations on the user's skin.

Additionally, as shown in FIGS. 12 and 14, facial-interface cushion 126 may include curved surfaces arcing between cushion user-side surface 184 and each of cushion inclined surfaces 183. Facial-interface cushion 126 may also include curved surfaces arcing between cushion recess surface 181 and each of cushion inclined surfaces 183. Such curved surfaces may abut and/or contact nasal regions of a user's face, reducing discomfort and preventing the formation of residual marks and/or indentations on the user's skin.

Figure 15:
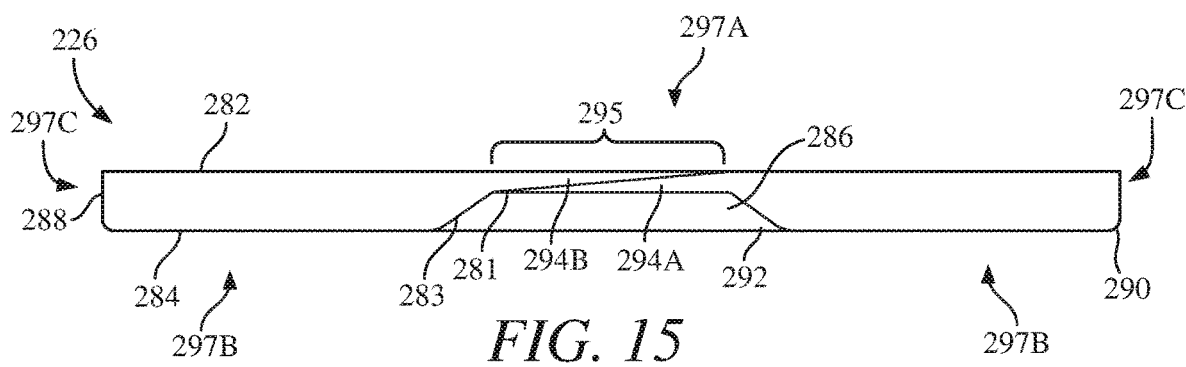
FIG. 15 is a side view of an exemplary facial-interface cushion for a head-mounted display.

FIG. 15 shows a facial-interface cushion 226 molded from foam layer 270 shown in FIG. 5 according to some embodiments. Facial-interface cushion 226 may be molded in any suitable mold assembly, such as mold assembly 131 illustrated in FIGS. 8-11.

As shown in FIG. 15, facial-interface cushion 226 may include a cushion nasal region 297A corresponding to a nasal region of the user's face, cushion cheek regions 297B corresponding to cheek regions of the user's face, cushion temple regions (e.g., cushion temple regions 197C shown in FIGS. 12 and 13) corresponding to temple regions of the user's face, and a cushion forehead region (e.g., cushion forehead region 197D shown in FIGS. 12 and 13) corresponding to a forehead region of the user's face. Facial-interface cushion 226 may include a cushion display-side surface 282 dimensioned to abut mounting surface 125 of facial-interface mounting member 124 shown in FIG. 1 and a cushion user-side surface 284 dimensioned to abut a facial portion of a user when head-mounted-display system 100 is worn by the user. Facial-interface cushion 226 may also include a cushion inner side surface 286 and a cushion peripheral side surface 288 extending from cushion display-side surface 282 and/or extending between cushion display-side surface 282 and cushion user-side surface 284 in a thickness direction of facial-interface cushion 226. Facial-interface cushion 226 may additionally include a cushion peripheral curved surface 290 and/or a cushion inner curved surface 292 each arcing from at least a portion of cushion user-side surface 284 toward cushion display-side surface 282.

According to at least one embodiment, facial-interface cushion 226 may include an overlapped region 295 including a first end portion 294A and a second end portion 294B having an interface corresponding to first layer end surface 278A and second layer end surface 278B of foam layer 270. First end portion 294A may be bonded to second end portion 294B. Prior to molding foam layer 270 for form facial-interface cushion 226, foam layer 270 may be positioned in a mold assembly (e.g., mold assembly 131 shown in FIGS. 8-11) such that first layer end surface 278A of foam layer 270 shown in FIG. 5 overlaps and at least partially faces and/or contacts second layer end surface 278B. Foam layer 270 may then be compressed and molded to form the sloped interface between first end portion 294A and second end portion 294B of facial-interface cushion 226, as illustrated in FIG. 15. Overlapped region 295 may form at least a portion of a cushion recessed surface 281 in cushion nasal region 297A. Facial-interface cushion 226 may also include cushion inclined surfaces 283 sloping from cushion recessed surface 281 to adjacent portions of cushion user-side surface 284.

Figure 16:
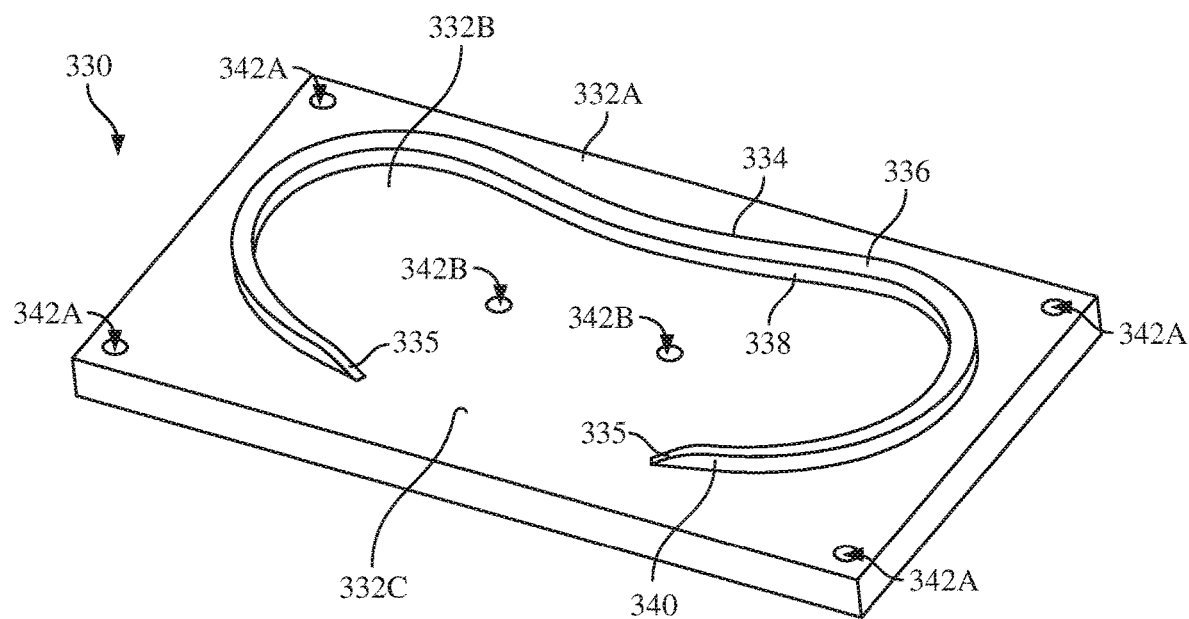
FIG. 16 is a perspective view of an exemplary insertion mold member of a mold assembly for manufacturing a facial-interface cushion.
Figure 17:
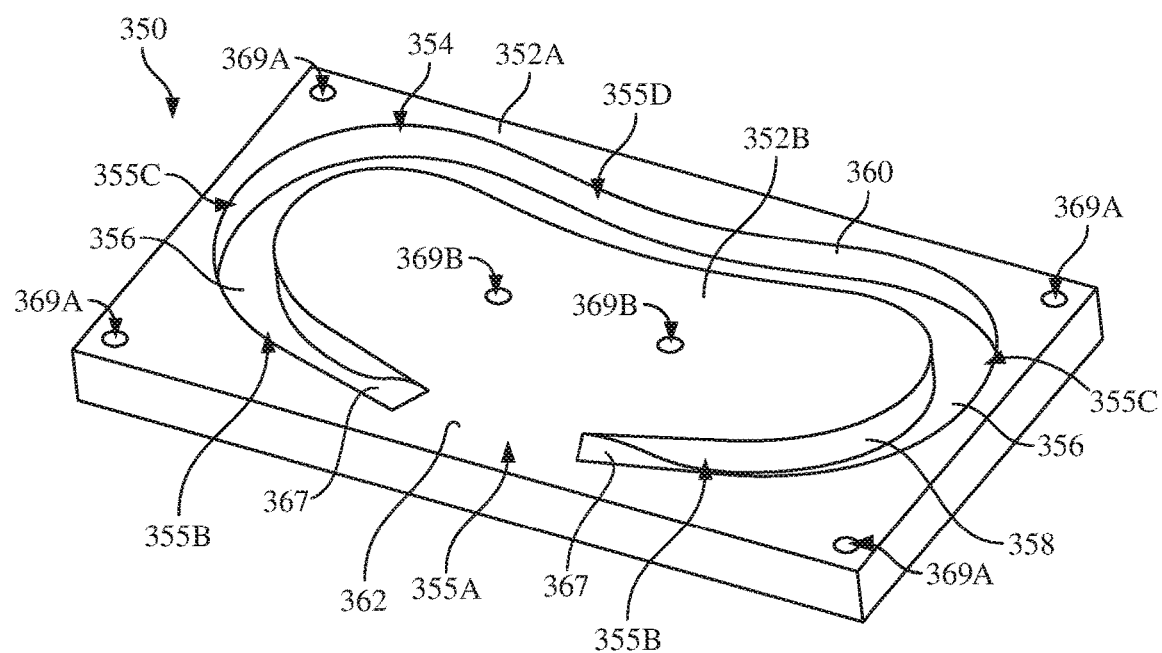
FIG. 17 is a perspective view of an exemplary recessed mold member of a mold assembly for manufacturing a facial-interface cushion.

FIGS. 16 and 17 are perspective views showing exemplary components of a mold assembly (e.g., mold assembly 331 shown in FIGS. 18-21) for manufacturing a facial-interface cushion (e.g., facial-interface cushion 326 shown in FIGS. 22 and 23) according to some embodiments. FIG. 16 illustrates an exemplary insertion mold member 330 and FIG. 17 illustrates an exemplary recessed mold member 350 that is utilized with insertion mold member 330 to mold and form a facial-interface cushion from a foam layer (e.g., foam layer 170 shown in FIG. 4). Insertion mold member 330 and recessed mold member 350 may each include any suitable materials for molding a facial-interface cushion in a heated environment, including materials described above in relation to insertion mold member 130 and recessed mold member 150, without limitation.

As shown in FIG. 16, insertion mold member 330 may include an outer mold facing surface 332A and an inner mold facing surface 332B configured to face and/or contact corresponding facing surfaces of a recessed mold member 350. Outer mold facing surface 332A and inner mold facing surface 332B may each have any suitable surface shape, without limitation. For example, outer mold facing surface 332A and/or inner mold facing surface 332B may be substantially planar surfaces. In some examples, insertion mold member 330 may also include an intermediate mold facing surface 332C extending between a portion of outer mold facing surface 332A and inner mold facing surface 332B. For example, intermediate mold facing surface 332C may be located in a region of insertion mold member 330 configured to mold a nasal region of a facial interface cushion, as will be described in greater detail below.

Insertion mold member 330 may also include a protruding portion 334 that protrudes from outer mold facing surface 332A and inner mold facing surface 332B. As shown in FIG. 16, protruding portion 334 may include a protrusion end surface 336, a protrusion inner side surface 338, and a protrusion peripheral side surface 340. Protrusion end surface 336 may have any suitable surface shape, including, for example, a substantially planar surface. Protrusion inner side surface 338 may extend between inner mold facing surface 332B and protrusion end surface 336 and protrusion peripheral side surface may extend between outer mold facing surface 332A and protrusion end surface 336. In some examples, protruding portion 334 may extend along an arcuate path. For example, as shown in FIG. 16, protruding portion 334 may follow a partially looped path, with protrusion inner side surface 338 formed on an inner portion of the partially looped path surrounding inner mold facing surface 332B and protrusion peripheral side surface 340 formed on a periphery of the partially looped path surrounded by outer mold facing surface 332A. In one example, protruding portion 334 may include at least one protrusion sloped surface 335 sloping between an end of protrusion end surface 336 and intermediate mold facing surface 332C. Additionally or alternatively, protruding portion 334 may follow a substantially or fully looped path such that inner mold facing surface 332B is substantially or fully surrounded by protruding portion 334.

Protruding portion 334 may have any suitable shape, size, and configuration. While protruding portion 334 may include angular edges as illustrated in FIG. 16, protruding portion 334 may additionally or alternatively include rounded and/or sloped edges and/or surfaces. In some embodiments, insertion mold member 330 may include a plurality of separate protruding portions rather than a single protruding portion 334. In at least one embodiment, insertion mold member 330 may not include a protruding portion extending from outer mold facing surface 332A and inner mold facing surface 332B. Rather, insertion mold member 330 may, for example, include a continuous facing surface (e.g., a substantially planar surface) extending over the regions corresponding to outer mold facing surface 332A, inner mold facing surface 332B, intermediate mold facing surface 332C, and protruding portion 334.

In one embodiment, at least one alignment hole for aligning insertion mold member 330 with recessed mold member 350 shown in FIG. 17 may be defined within insertion mold member 330. For example, as illustrated in FIG. 16, a plurality of outer alignment holes 342A may be defined in insertion mold member 330 extending from outer mold facing surface 332A through at least a portion of insertion mold member 330. Additionally or alternatively, a plurality of inner alignment holes 342B may be defined in insertion mold member 330 extending from inner mold facing surface 332B through at least a portion of insertion mold member 330. One or more of outer alignment holes 342A and/or inner alignment holes 342B may, for example, extend through insertion mold member 330 in a thickness direction (e.g., a direction substantially perpendicular to outer mold facing surface 332A and/or inner mold facing surface 332B) from outer mold facing surface 332A and/or inner mold facing surface 332B to a rear surface of insertion mold member 330 opposite outer mold facing surface 332A and/or inner mold facing surface 332B.

FIG. 17 illustrates recessed mold member 350, which may include an outer mold facing surface 352A configured to face and/or abut corresponding outer mold facing surface 332A of insertion mold member 330 as part of a mold assembly (e.g., mold assembly 331 illustrated in FIGS. 18-21). Additionally, recessed mold member 350 may include an inner mold facing surface 352B configured to face and/or abut corresponding inner mold facing surface 332B of insertion mold member 330 as part of the mold assembly. Outer mold facing surface 352A and inner mold facing surface 352B may each have any suitable surface shape, without limitation. For example, outer mold facing surface 352A and/or inner mold facing surface 352B may be substantially planar surfaces.

Recessed mold member 350 may additionally define a mold channel 354 within a portion of recessed mold member 350. Mold channel 354 may extend into recessed mold member 350 from outer mold facing surface 352A and/or inner mold facing surface 352B. In some examples, mold channel 354 may extend along an arcuate path. For example, as shown in FIG. 17, mold channel 354 may follow a partially looped path corresponding to a partially looped path followed by protruding portion 334 of insertion mold member 330 such that protruding portion 334 of insertion mold member 330 is at least partially disposed within mold channel 354 of recessed mold member 350 as part of a mold assembly (e.g., mold assembly 331 illustrated in FIGS. 20 and 21). Additionally or alternatively, mold channel 354 may follow a substantially or fully looped path corresponding to a substantially or fully looped path followed by protruding portion 334.

In some embodiments, mold channel 354 may be sized and shaped to hold and form a foam layer (see, e.g., foam layer 170 illustrated in FIG. 4). Mold channel 354 may include various regions corresponding to regions of a facial-interface cushion molded within mold channel 354. For example, mold channel 354 may include a nasal region 355A that molds a portion of a facial-interface cushion dimensioned to abut and/or contact a nasal region of a user's face, cheek regions 355B that mold portions of a facial-interface cushion dimensioned to abut and/or contact cheek regions of a user's face, temple regions 355C that mold portions of a facial-interface cushion dimensioned to abut and/or contact temple regions of a user's face, and a forehead region 355D that molds a portion of a facial-interface cushion dimensioned to abut and/or contact a forehead region of a user's face.

As illustrated in FIG. 17, mold channel 354 may be defined by a channel bottom surface 356, which includes a surface of recessed mold member 350 disposed to a greatest depth within recessed mold member 350 relative to outer mold facing surface 352A and/or inner mold facing surface 352B. Mold channel 354 may also be defined by a channel inner side surface 358 and a channel peripheral side surface 360. Channel inner side surface 358 may define an inner portion of mold channel 354 following an inner portion of an arcuate path surrounding inner mold facing surface 352B and channel peripheral side surface 360 may define a peripheral portion of mold channel 354 following a periphery of the arcuate path surrounded by outer mold facing surface 352A.

In some embodiments, as shown in FIG. 17, mold channel 354 may also be defined by a channel raised surface 362 of recessed mold member 350 that is located at a shallower depth than channel bottom surface 356 relative to outer mold facing surface 352A and/or inner mold facing surface 352B. In one example, as illustrated in FIG. 17, channel raised surface 362 may be substantially congruent with outer mold facing surface 352A and/or inner mold facing surface 352B.

In some examples, channel raised surface 362 may define a portion of mold channel 354 in nasal region 355A. In this example, one or more portions of recessed mold member 350 may include channel inclined surfaces 367 sloping between ends of channel raised surface 362 and adjacent portions of channel bottom surface 356.

According to at least one embodiment, at least one alignment hole for aligning recessed mold member 350 with insertion mold member 330 may be defined within recessed mold member 350. For example, as illustrated in FIG. 17, a plurality of outer alignment holes 369A may be defined in recessed mold member 350 extending from outer mold facing surface 352A through at least a portion of recessed mold member 350. Additionally or alternatively, a plurality of inner alignment holes 369B may be defined in recessed mold member 350 extending from inner mold facing surface 352B through at least a portion of recessed mold member 350. One or more of outer alignment holes 369A and/or inner alignment holes 369B may, for example, extend at least partially through recessed mold member 350 in a thickness direction (e.g., a direction substantially perpendicular to outer mold facing surface 352A and/or inner mold facing surface 352B) from outer mold facing surface 352A and/or inner mold facing surface 352B toward a rear surface of recessed mold member 350 opposite outer mold facing surface 352A and/or inner mold facing surface 352B.

Figure 18:
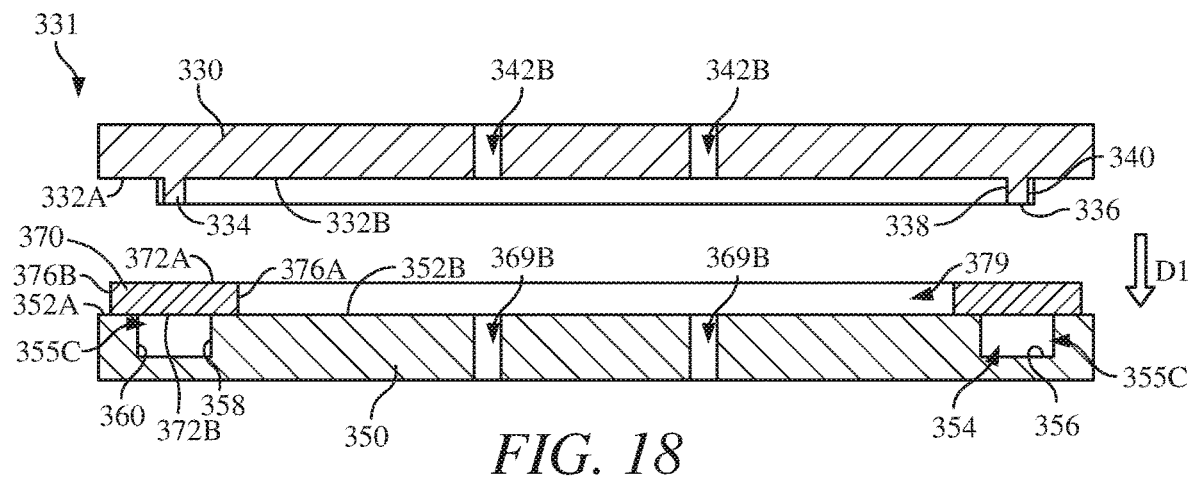
FIG. 18 is a cross-sectional view of a foam layer positioned in an exemplary mold assembly for manufacturing a facial-interface cushion.
Figure 19:
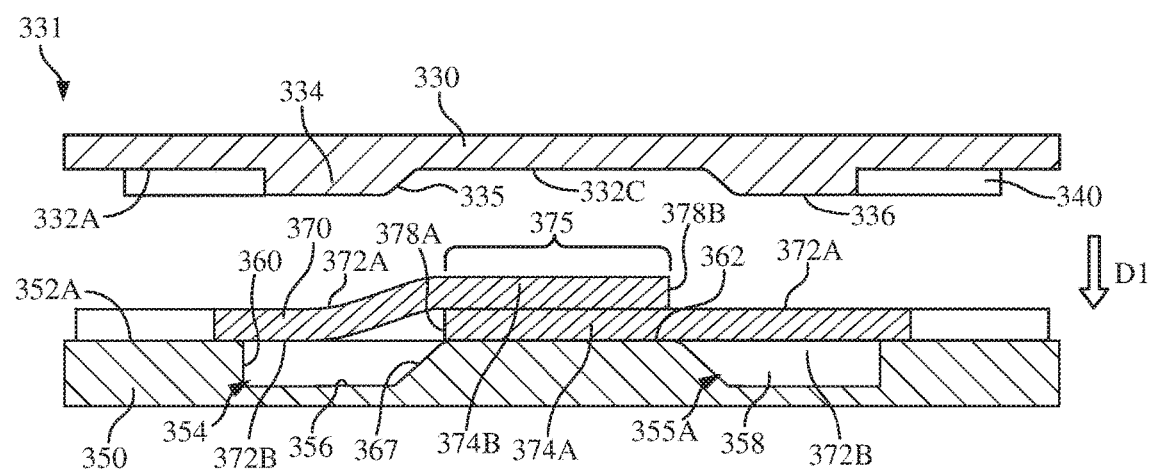
FIG. 19 is a cross-sectional view of a foam layer positioned in an exemplary mold assembly for manufacturing a facial-interface cushion.

FIGS. 18-21 are cross-sectional views illustrating a mold assembly 331 for molding a foam layer 370 (see, e.g., foam layer 170 illustrated in FIG. 4) into a facial-interface cushion in accordance with some embodiments. As shown in FIGS. 18 and 19, foam layer 370 may be loaded between insertion mold member 330 and recessed mold member 350. Foam layer 370 may include any material (e.g., a thermoplastic and/or thermosetting foam material) that is moldable into a facial-interface cushion in a mold assembly when exposed to elevated heat, including any of the materials discussed above in relation to foam layer 170. In at least one embodiment, foam layer 370 may be cut from a larger layer (e.g., a foam sheet) and/or otherwise formed prior to molding. In one embodiment, foam layer 370 may additionally or alternatively be cut following molding to trim away selected portions. As shown, for example, in FIGS. 18 and 19, foam layer 370 may include a layer upper surface 372A and a layer lower surface 372B opposite layer upper surface 372A. Foam layer 370 may also include a first layer side surface 376A and a second layer side surface 376B extending between layer upper surface 372A and layer lower surface 372B. First layer side surface 376A may define an opening 379 extending through foam layer 370 in a thickness direction.

As shown in FIGS. 18 and 19, foam layer 370 may be disposed within mold assembly 331 overlapping at least a portion of mold channel 354 defined in recessed mold member 350. According to some embodiments, recessed mold member 350 may include a raised surface and/or lip (not shown) surrounding a region of foam layer 370 to position and/or hold foam layer 370 in place over mold channel 354 prior to and/or during molding. In this example, insertion mold member 330 may include a protruding portion (not shown) shaped to fit within such a raised surface and/or lip of recessed mold member 350 and contact corresponding portions of foam layer 370. Additionally or alternatively, insertion mold member 330 may include a recess (not shown) shaped to receive such a raised surface and/or lip of recessed mold member 350.

In some examples, layer lower surface 372B of foam layer 370 may face toward mold channel 354 and layer upper surface 372A of foam layer 370 may face away from mold channel 354. At least a portion of foam layer 370 may be disposed on outer mold facing surface 352A and/or inner mold facing surface 352B of recessed mold member 350. For example, portions of foam layer 370 may have greater widths than corresponding portions of mold channel 354 overlapped by foam layer 370 such that foam layer 370 substantially or completely overlaps mold channel 354 and regions of outer mold facing surface 352A and inner mold facing surface 352B adjacent to mold channel 354.

As shown in FIG. 19, overlapped region 375 of foam layer 370 may include a first end portion 374A and a second end portion 374B overlapping first end portion 374A. For example, second end portion 374B adjacent to and/or including second layer end surface 378B may overlap first end portion 374A adjacent to and/or including first layer end surface 378A such that layer lower surface 372B of second end portion 374B abuts and/or contacts layer upper surface 372A of first end portion 374A. In some embodiments, first end portion 374A may directly contact second end portion 374B. In at least one embodiment, a layer, such as an adhesive layer (e.g., a hot-melt adhesive, etc.) for bonding first end portion 374A to second end portion 374B may be disposed between at least a portion of first end portion 374A and second end portion 3746.

In some embodiments, overlapped region 375 of foam layer 370 may be disposed in a portion of mold channel 354 and/or on a portion of recessed mold member 350 shaped to form a region of facial-interface cushion 326 configured to abut a nasal region of a user's face. For example, overlapped region 375 of foam layer 370 may be disposed on channel raised surface 362 of recessed mold member 350. Channel raised surface 362 may be shaped to form a portion of facial-interface cushion 326 having a reduced thickness relative to other portions of facial-interface cushion 326 formed within regions of mold channel 354. In some embodiments, first end portion 374A may be disposed on channel raised surface 362 and second end portion 374B may be disposed on first end portion 374A between first end portion 374A and intermediate mold facing surface 332C of insertion mold member 330, as shown in FIG. 19. In at least one example, second end portion 374B may be disposed on channel raised surface 362 and first end portion 374A may be disposed on second end portion 374B between second end portion 374B and intermediate mold facing surface 332C.

According to some embodiments, insertion mold member 330 and/or recessed mold member 350 may be heated prior to loading foam layer 370 into mold channel 354 and/or between insertion mold member 330 and recessed mold member 350. For example, insertion mold member 330 and/or recessed mold member 350 may be pre-heated to an elevated temperature at or above a specified temperature (e.g., a softening point) for softening foam layer 370. In at least one embodiment, insertion mold member 330 and/or recessed mold member 350 may be maintained at the elevated temperature during molding. In some examples, insertion mold member 330 and/or recessed mold member 350 may be pre-heated to the elevated temperature but may not be further heated during molding. In some embodiments, foam layer 370 may be heated separately from insertion mold member 330 and/or recessed mold member prior to loading foam layer 370 into mold assembly 331. For example, foam layer 370 may be heated to an elevated temperature at or above the specified temperature to soften foam layer 370, after which foam layer 370 may be loaded into mold assembly 331 with or without further heating from insertion mold member 330 and/or recessed mold member 350. In one embodiment, mold assembly 331 may be disposed within a heated vessel to heat mold assembly 331 and foam layer 370 during molding.

Once foam layer 370 is loaded into mold assembly 331, insertion mold member 330 may be moved toward recessed mold member 350 and foam layer 370 in direction D1 shown in FIGS. 18-21. Although not illustrated in FIGS. 18-21, guides, such as alignment pins, may be disposed within outer alignment holes 342A and/or inner alignment holes 342B defined in insertion mold member 330 and within corresponding outer alignment holes 369A and/or inner alignment holes 369B defined in recessed mold member 350 to guide and/or hold insertion mold member 330 in proper alignment with recessed mold member 350.

Figure 20:
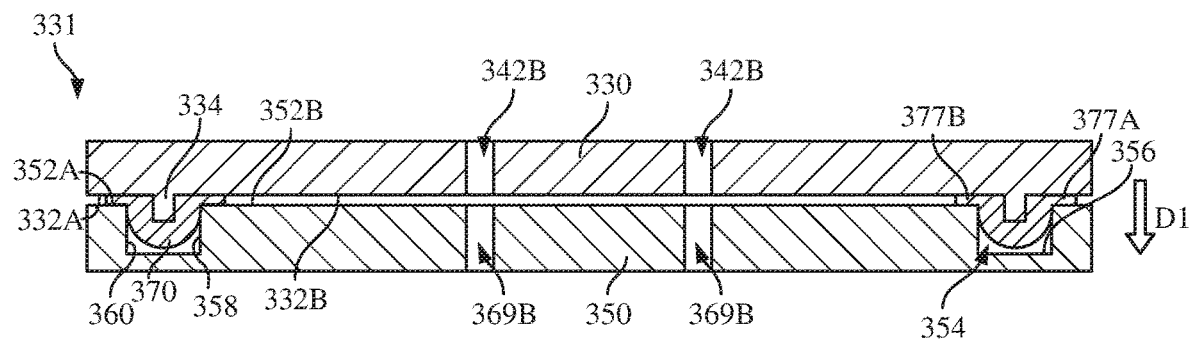
FIG. 20 is a cross-sectional view of a shaped foam element disposed in an exemplary mold assembly for manufacturing a facial-interface cushion.
Figure 21:
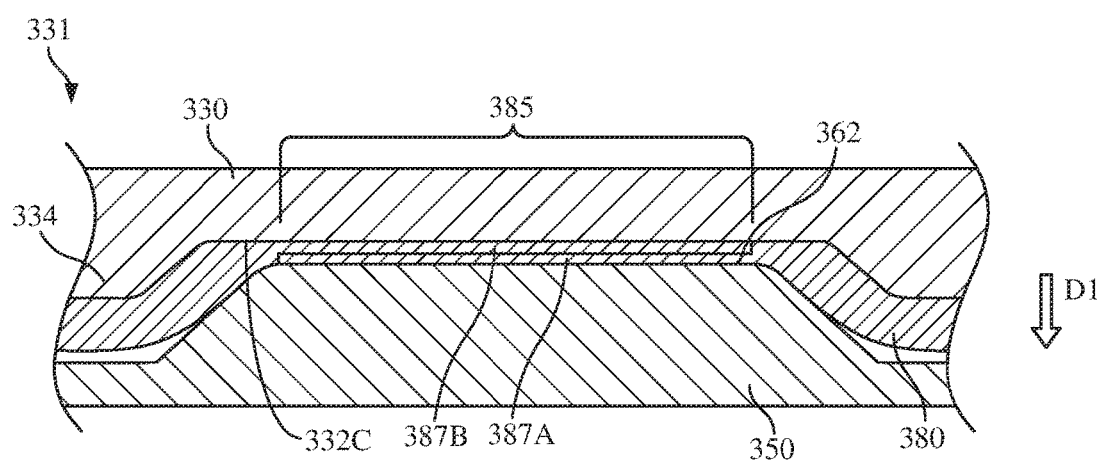
FIG. 21 is a partial cross-sectional view of a shaped foam element disposed in an exemplary mold assembly for manufacturing a facial-interface cushion.

As illustrated in FIGS. 20 and 21, insertion mold member 330 may be moved in direction D1 until insertion mold member 330 is disposed in close proximity to and/or abutting recessed mold member 350. For example, as shown in FIGS. 20 and 21, outer mold facing surface 332A and inner mold facing surface 332B of insertion mold member 330 may respectively be disposed near to and/or abutting outer mold facing surface 352A and inner mold facing surface 352B of recessed mold member 350. As protruding portion 334 of insertion mold member 330 is inserted into mold channel 354 defined in recessed mold member 350, protrusion end surface 336, outer mold facing surface 332A and/or inner mold facing surface 332B of insertion mold member 330 may force at least a portion of foam layer 370 overlapping mold channel 354 at least partially into mold channel 354 toward channel bottom surface 356, forming shaped foam element 380 shown in FIGS. 20 and 21.

As portions of foam layer 370 overlapping mold channel 354 are forced into mold channel 354 by insertion mold member 330, at least a portion of foam layer 370 overlapping regions of outer mold facing surface 352A and/or inner mold facing surface 352B of recessed mold member 350 adjacent to mold channel 354 may be clamped and compressed between these regions of outer mold facing surface 352A and/or inner mold facing surface 352B and adjacent regions of outer mold facing surface 332A and/or inner mold facing surface 332B of insertion mold member 330. For example, as illustrated in FIGS. 20 and 21, shaped foam element 380 may include an outer clamped portion 377A, which is held and compressed between outer mold facing surface 332A of insertion mold member 330 and outer mold facing surface 352A of recessed mold member 350, and an inner clamped portion 377B, which is held and compressed between inner mold facing surface 332B of insertion mold member 330 and inner mold facing surface 352B of recessed mold member 350. Additionally, a portion of shaped foam element 380 overlapping channel raised surface 362 of recessed mold member 350 shown in FIG. 17 may be clamped between raised surface 362 and intermediate mold facing surface 332C of insertion mold member 330. Foam layer 370 and shaped foam element 380 may be held in place in mold assembly 331 at the clamped regions as insertion mold member 330 is moved adjacent to recessed mold member 350 and during molding of shaped foam element 380.

According to at least one embodiment, as portions of foam layer 370 are forced into mold channel 354 by insertion mold member 330, forming shaped foam element 380, at least a portion of shaped foam element 380 disposed within mold channel 354 may not contact at least a portion of recessed mold member 350 defining mold channel 354. For example, shaped foam element 380 may not contact portions of channel inner side surface 358, channel peripheral side surface 360, and/or channel bottom surface 356, as shown in FIGS. 20 and 21. In at least one example, shaped foam element 380 may not contact any portion of channel bottom surface 356 during molding. As shown in FIGS. 20 and 21, for example, shaped foam element 380 may have a curved surface (e.g., a free-form surface) within mold channel 354 that is not formed by portions of channel inner side surface 358, channel peripheral side surface 360, and/or channel bottom surface 356. For example, shaped foam element 380 may arc between outer clamped portion 377A and inner clamped portion 377B, and/or between channel inner side surface 358, channel peripheral side surface 360, within mold channel 354.

Various factors may influence a degree to which shaped foam element 380 does or does not contact various surface regions of recessed mold member 350 defining mold channel 354. Such factors may be varied to form desired surfaces on shaped foam element 380, and likewise on facial-interface cushion 326, during molding. For example, the thickness and density of foam layer 370 may influence a volume of shaped foam element 380 disposed within mold channel 354. If a sufficient volume of foam layer 370 is forced into mold channel 354, portions of shaped foam element 380 may contact portions of channel inner side surface 358, channel peripheral side surface 360, and/or channel bottom surface 356. Additionally, a shape of mold channel 354, such as widths and depths of various portions of mold channel 354, may influence whether shaped foam element 380 contacts portions of channel inner side surface 358, channel peripheral side surface 360, and/or channel bottom surface 356 defining mold channel 354. Moreover, a shape of protruding portion 334 of insertion mold member 330, such as widths and heights of regions of protruding portion 334, may influence whether shaped foam element 380 contacts portions of channel inner side surface 358, channel peripheral side surface 360, and/or channel bottom surface 356 defining mold channel 354. Insertion mold member 330 including protruding portion 334, as shown in FIGS. 16 and 18-21, may force a volume of shaped foam element 380 further into mold channel 354 than an insertion mold member that does not include protruding portion 334.

In some embodiments, at least a portion of shaped foam element 380 may contact and conform to surface regions of recessed mold member 350 defining mold channel 354. For example, shaped foam element 380 may contact at least a portion of channel raised surface 362 and/or channel inclined surfaces 367 illustrated in FIGS. 17, 19, and 21. In some embodiments, at least a portion of shaped foam element 380 may contact at least a portion of channel bottom surface 356, channel inner side surface 358, and/or channel peripheral side surface 360. Portions of shaped foam element 380, which is heated to soften the foam material, may conform to and assume a shape corresponding to the surface portions of recessed mold member 350 and insertion mold member 330 contacting shaped foam element 380. In some embodiments, portions of shaped foam element 380 not contacting surface portions of recessed mold member 350 may define curved surfaces arcing between the portions of shaped foam element 380 contacting surface regions of recessed mold member 350.

As shown in FIGS. 20 and 21, protruding portion 334 of insertion mold member 330 may extend into a portion of shaped foam element 380, forming a channel within shaped foam element 380, as will be described in greater detail below in reference to FIGS. 22 and 23. Additionally, protruding portion 334 may further push at least a portion of shaped foam element 380 into mold channel 354 of recessed mold member 350. In some embodiments, as shown in FIGS. 20 and 21, at least a portion of shaped foam element 380 may be disposed between protruding portion 334 and at least a portion of channel bottom surface 356, channel inner side surface 358, and/or channel peripheral side surface 360. In at least one embodiment, insertion mold member 330 may not include a protruding portion extending from outer mold facing surface 332A and inner mold facing surface 332B such that a channel is not formed within shaped foam element 380.

In some embodiments, as shown in FIG. 21, shaped foam element 380 may include an overlapped region 385 corresponding to overlapped region 375 of foam layer 370 shown in FIG. 19. Overlapped region 385 may be compressed between intermediate mold facing surface 332C of insertion mold member 330 and channel raised surface 362 of recessed mold member 350. Overlapped region 385 of shaped foam element 380 may include a first end portion 387A corresponding to first end portion 374A of foam layer 370 and a second end portion 387B corresponding to second end portion 374B of foam layer 370. As shown in FIG. 21, first end portion 387A may be compressed against second end portion 387B. Overlapped region 385 may have a reduced thickness between intermediate mold facing surface 332C of insertion mold member 330 and channel raised surface 362 of recessed mold member 350 relative to other regions of shaped foam element 380. As such, first end portion 387A may be compressed against second end portion 387B with a force that exceeds forces applied to other portions of shaped foam element 380 disposed between insertion mold member 330 and recessed mold member 350. Such increased force applied to first end portion 387A and second end portion 387B in overlapped region 385 may facilitate bonding of first end portion 387A to second end portion 387B during molding of shaped foam element 380 to form facial-interface cushion 326.

Shaped foam element 380 may be held between insertion mold member 330 and recessed mold member 350 for a time sufficient for shaped foam element 380 to be molded within mold channel 354 of recessed mold member 350, forming facial-interface cushion 326. Additionally, shaped foam element 380 may be held between insertion mold member 330 and recessed mold member 350 for an amount of time sufficient to enable first end portion 387A to be bonded to second end portion 387B in overlapped region 385. For example, shaped foam element 380 may be held between insertion mold member 330 and recessed mold member 350, as shown in FIGS. 20 and 21, for any of the time periods discussed above in reference to shaped foam element 180 and mold assembly 131. In some embodiments, shaped foam element 380 may be subjected to increased pressure during heating and molding, including any of the pressures or ranges of pressures discussed above in reference to shaped foam element 180 and mold assembly 131.

After shaped foam element 380 has been held within mold assembly 331 for a suitable period of time to form facial-interface cushion 326, insertion mold member 330 may be separated from recessed mold member 350 and molded facial-interface cushion 326 may be removed from mold assembly 331. According to some embodiments, facial-interface cushion 326 may be removed from mold assembly 331 and allowed to cool outside of mold assembly 331. For example, facial-interface cushion 326 may be removed from mold channel 354 defined in recessed mold member 350 and cooled to a temperature below the specified temperature (e.g., softening point) to allow facial-interface cushion 326 to solidify and maintain the molded shape. Additionally or alternatively, facial-interface cushion 326 may be at least partially cooled within recessed mold member 350 prior to removing facial-interface cushion 326 from mold assembly 331.

Figure 22:
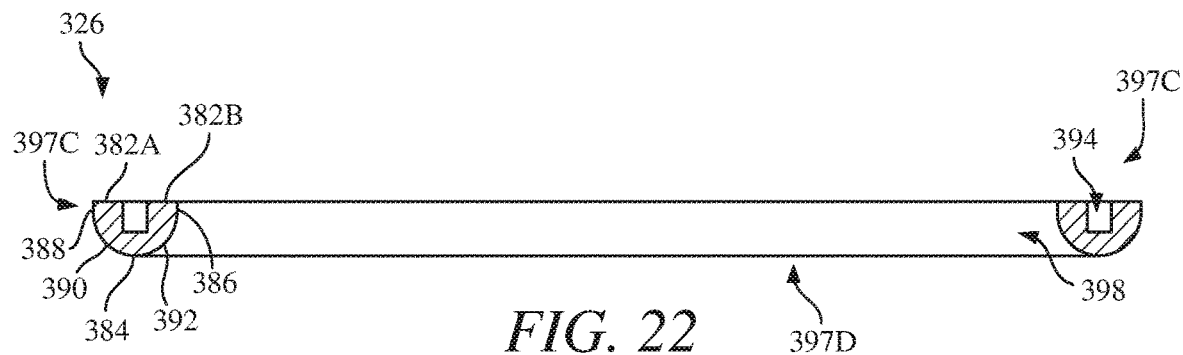
FIG. 22 is a cross-sectional view of an exemplary facial-interface cushion for a head-mounted display.
Figure 23:
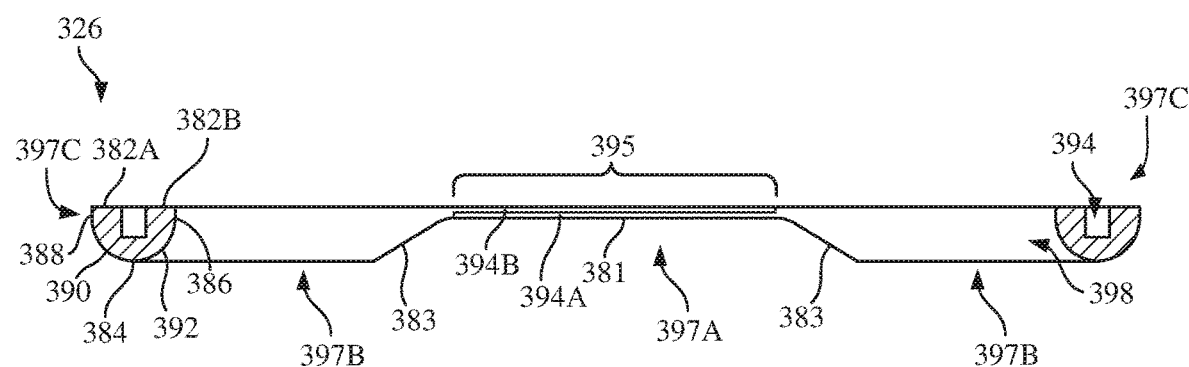
FIG. 23 is a cross-sectional view of an exemplary facial-interface cushion for a head-mounted display.

FIGS. 22 and 23 are cross-sectional views of a facial-interface cushion 326 molded by mold assembly 331 illustrated in FIGS. 18-21. While the features shown in FIGS. 22 and 23 are illustrated in relation to facial-interface cushion 326, corresponding features may be present on shaped foam element 380 disposed within mold assembly 331 shown in FIGS. 20 and 21.

In some embodiments, following molding, as described above in reference to FIGS. 18-21, portions of a molded facial-interface cushion may be removed by, for example, cutting to form facial-interface cushion 326 shown in FIGS. 22 and 23. For example, portions of a molded facial-interface cushion formed in mold assembly 331, such as portions corresponding to outer clamped portion 377A and/or inner clamped portion 377B of shaped foam element 380 shown in FIGS. 20 and 21, may be removed by, for example, die cutting.

Facial-interface cushion 326 may include various regions dimensioned to abut and/or conform to selected portions of a user's face when a head-mounted-display system (e.g., head-mounted-display system 100 shown in FIG. 1) including facial-interface cushion 326 is worn by a user. For example, as shown in FIGS. 22 and 23, facial-interface cushion 326 may include a cushion nasal region 397A corresponding to a nasal region of the user's face, cushion cheek regions 397B corresponding to cheek regions of the user's face, cushion temple regions 397C corresponding to temple regions of the user's face, and a cushion forehead region 397D corresponding to a forehead region of the user's face. In some embodiments, a portion of facial-interface cushion 326 in cushion nasal region 397A may be thinner than other portions of facial-interface cushion 326.

Facial-interface cushion 326 may include a cushion peripheral display-side surface 382A and a cushion inner display-side surface 382B that are dimensioned to abut a mounting member of a head-mounted display (e.g., facial-interface mounting member 124 shown in FIG. 1). Cushion peripheral display-side surface 382A and cushion inner display-side surface 382B may be respectively formed by outer mold facing surface 332A and inner mold facing surface 332B of insertion mold member 330 during molding.

According to at least one embodiment, a cushion channel 394 may be defined in facial-interface cushion 326 extending from cushion peripheral display-side surface 382A and/or cushion inner display-side surface 382B. Cushion channel 394 may have any suitable shape, size, and configuration. In one example, a plurality of separate cushion channels and/or recesses may be defined in facial-interface cushion 326. In at least one embodiment, facial-interface cushion 326 may be formed without a cushion channel. In some embodiments, cushion channel 394 may be formed by protruding portion 334 of insertion mold member 330, as illustrated in FIGS. 20 and 21. In some embodiments, cushion channel 394 may facilitate dissipation of heat in facial-interface cushion 326 during use. For example, cushion channel 394 may allow for movement of air within facial-interface cushion 326 and/or between facial-interface cushion 326 and an adjacent region of a head-mounted display (e.g., facial-interface mounting member 124 shown in FIG. 1) to which facial-interface cushion 326 is attached. Such movement of air may cool at least a portion of facial-interface cushion 326, preventing build-up of excess heat in facial-interface cushion 326 and/or a region of a head-mounted display surrounded by facial-interface cushion 326 (e.g., viewing region 122 of head-mounted display 102 shown in FIG. 1). By dissipating heat in facial-interface cushion 326, cushion channel 394 may prevent fogging of lenses of a head-mounted display (e.g., lenses 104 of head-mounted display 102 illustrated in FIG. 1) and/or lenses worn by a user (e.g., eyeglass lenses) during use. Additionally, cushion channel 394 may prevent user discomfort by dissipating heat in regions of facial-interface cushion 326 contacting the user's face.

Facial-interface cushion 326 may also include a cushion user-side surface 384 dimensioned to abut facial regions of a user. For example, cushion user-side surface 384 may be configured to contact and/or conform to at least a portion of the user's nose, cheek, temple, and/or forehead facial regions. According to some embodiments, facial-interface cushion 326 may include a cushion inner side surface 386 extending from cushion inner display-side surface 382B and a cushion peripheral side surface 388 extending from cushion peripheral display-side surface 382A in a thickness direction of facial-interface cushion 326. As shown in FIGS. 22 and 23, cushion inner side surface 386 may define a viewing opening 398 extending through facial-interface cushion 326.

According to at least one embodiment, facial-interface cushion 326 may include an overlapped region 395 including a first end portion 394A corresponding to first end portion 374A of foam layer 370 and a second end portion 394B corresponding to second end portion 374B of foam layer 370. First end portion 394A may be bonded to second end portion 394B. Overlapped region 395 may form at least a portion of a cushion recessed surface 381 in cushion nasal region 397A. Cushion recessed surface 381 may be formed by channel raised surface 362 of recessed mold member 350 during molding and may have any suitable shape, size, and configuration. A portion of facial-interface cushion 326 between cushion recessed surface 381 and cushion peripheral display-side surface 382A and/or cushion inner display-side surface 382B may be thinner than other portions of facial-interface cushion 326 between cushion user-side surface 384 and cushion peripheral display-side surface 382A and/or cushion inner display-side surface 382B. Facial-interface cushion 326 may also include cushion inclined surfaces 383 sloping from cushion recessed surface 381 to adjacent portions of cushion user-side surface 384. Cushion inclined surfaces 383 may be formed by channel inclined surfaces 367 of recessed mold member 350 during molding.

According to some embodiments, facial-interface cushion 326 may include a cushion peripheral curved surface 390 and/or a cushion inner curved surface 392 arcing from at least a portion of cushion user-side surface 384 toward cushion peripheral display-side surface 382A or cushion inner display-side surface 382B. For example, cushion peripheral curved surface 390 may arc between at least a peripheral side of cushion user-side surface 384 and at least a portion of cushion peripheral side surface 388, as shown in FIGS. 22 and 23. In at least one example, cushion peripheral curved surface 390 may additionally or alternatively arc between at least a peripheral side portion of cushion recessed surface 381 and/or cushion inclined surfaces 383 and at least a portion of cushion peripheral side surface 388. In at least one embodiment, as shown in FIGS. 22 and 23, cushion peripheral curved surface 390 may be formed around a substantial or entire peripheral portion of facial-interface cushion 326, including peripheral portions of facial-interface cushion 326 in cushion nasal region 397A, cushion cheek regions 397B, cushion temple regions 397C, and cushion forehead region 397D.

Cushion inner curved surface 392 may arc between at least an inner side of cushion user-side surface 384 surrounding viewing opening 398 and at least a portion of cushion inner side surface 386, as shown in FIGS. 22 and 23. In at least one example, cushion inner curved surface 392 may additionally or alternatively arc between at least an inner side portion of cushion recessed surface 381 and/or cushion inclined surfaces 383 surrounding viewing opening 398 and at least a portion of cushion inner side surface 386. In at least one embodiment, as shown in FIGS. 22 and 23, cushion inner curved surface 392 may be formed around a substantial or entire inner portion of facial-interface cushion 326 surrounding viewing opening 398, including inner portions of facial-interface cushion 326 in cushion nasal region 397A, cushion cheek regions 397B, cushion temple regions 397C, and cushion forehead region 397D. Cushion inner curved surface 392 may define a portion of viewing opening 398. In some embodiments, at least a portion of cushion peripheral curved surface 390 and/or cushion inner curved surface 392 may arc between at least a portion of cushion user-side surface 384, cushion recessed surface 381, and/or cushion inclined surface 383 and at least a portion of cushion inner display-side surface 382B or cushion peripheral display-side surface 382A.

In some embodiments, at least a portion of cushion user-side surface 384, cushion peripheral curved surface 390, cushion inner curved surface 392, cushion peripheral side surface 388, and/or cushion inner side surface 386 may be formed without contacting a surface region of recessed mold member 350 defining mold channel 354 during molding (see, e.g., FIGS. 20 and 21). For example, facial-interface cushion 326 may include free-form surfaces and/or surface regions, which are not formed by contacting surface regions of recessed mold member 350 during molding. Such free-form surfaces and/or surface regions may extend from cushion inner side surface 386 to cushion peripheral side surface 388 and may include at least a portion of cushion user-side surface 384, cushion peripheral curved surface 390, cushion inner curved surface 392, cushion peripheral side surface 388, and cushion inner side surface 386. Cushion peripheral curved surface 390 and/or cushion inner curved surface 392 may contact portions of a user's face at inner and peripheral regions of cushion user-side surface 384, cushion recessed surface 381, and/or cushion inclined surface 383 when a head-mounted-display system (e.g., head-mounted-display system 100 illustrated in FIG. 1) including facial-interface cushion 326 is worn by the user. In some embodiments, one or more surfaces and/or surface regions of facial-interface cushion 326 may be formed by contacting corresponding surface portions of recessed mold member 350 during molding of facial-interface cushion 326.

In some embodiments, as shown in FIG. 23, facial-interface cushion 326 may include curved surfaces arcing between cushion user-side surface 384 and each of cushion inclined surfaces 383. Facial-interface cushion 326 may also include curved surfaces arcing between cushion recess surface 381 and each of cushion inclined surfaces 383. Such curved surfaces may abut and/or contact nasal regions of a user's face, reducing discomfort and preventing the formation of residual marks and/or indentations on the user's skin.

Figure 24:
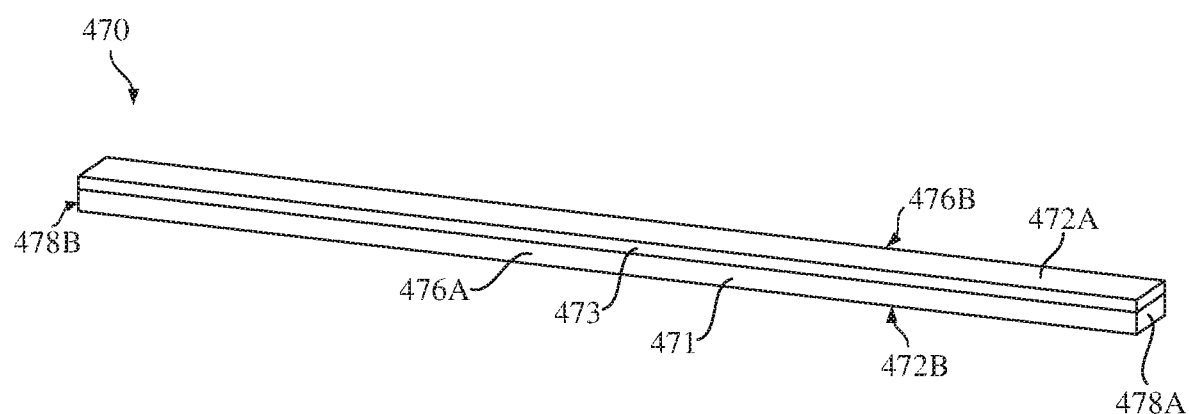
FIG. 24 is a perspective view of an exemplary foam layer assembly for producing a facial-interface cushion for a head-mounted display.

FIG. 24 is a perspective view showing an exemplary foam layer assembly 470 for producing a facial-interface cushion (e.g., facial-interface cushions 126 and 326 respectively shown in FIGS. 12-15, 22, and 23) according to some embodiments. In at least one embodiment, a foam layer disposed in a mold assembly may include a foam layer assembly 470 having a plurality of layers and/or materials.

As shown in FIG. 24, foam layer assembly 470 may include an assembly upper surface 472A and an assembly lower surface 472B opposite assembly upper surface 472A. Foam layer assembly 470 may also include a first assembly side surface 476A and a second assembly side surface 476B between assembly upper surface 472A and assembly lower surface 472B. Additionally, foam layer assembly 470 may have a first assembly end surface 478A at one end and a second assembly end surface 478B at an opposite end. Foam layer assembly 470 may be any suitable size, shape, and/or thickness. In some examples, foam layer assembly 470 may have a substantially constant thickness over its length and width.

According to some embodiments, foam layer assembly 470 may include a plurality of layers. For example, as shown in FIG. 24, foam layer assembly 470 may include a foam layer 471 and a secondary layer 473, which forms assembly upper surface 472A, overlapping foam layer 471. Secondary layer 473 may partially or fully overlap foam layer 471. In at least one embodiment, secondary layer 473 may alternatively be disposed on an opposite side of foam layer 471 so as to form assembly lower surface 472B of foam layer assembly 470. Foam layer assembly 470 may additionally or alternatively include any other suitable layers, without limitation. For example, foam layer 471 may be sandwiched between at least two separate overlapping layers. In at least one embodiment, foam layer 471 may include any material described above in reference to foam layer 170. For example, foam layer 471 may include a material (e.g., a thermoplastic and/or thermosetting polymer material) that is moldable into facial-interface cushion 126 in a mold assembly when exposed to elevated heat.

Secondary layer 473 may include any suitable material for forming a facial-interface cushion in conjunction with foam layer 471 during molding. In one example, secondary layer 473 may include a moldable foam material (e.g., a thermoplastic and/or thermosetting polymer material) and/or a non-moldable foam material. In some examples, secondary layer 473 may include a material (e.g., a hot-melt adhesive, pressure-sensitive adhesive, etc.) for bonding a molded facial-interface cushion to a mounting portion of a head-mounted display (e.g., facial-interface mounting portion 124 of head-mounted display 102 shown in FIG. 1). In at least one embodiment, secondary layer 473 may include a material (e.g., polymer, leather, cloth, woven, etc.) configured to comfortably contact portions of a user's face and/or protect foam layer 471 from wear and/or degradation. In some embodiments, secondary layer 473 may be adhered to foam layer 471 prior to molding foam layer assembly 470. In at least one embodiment, secondary layer 473 may be adhered to foam layer 471 during molding to form a facial-interface cushion.

Figure 25:
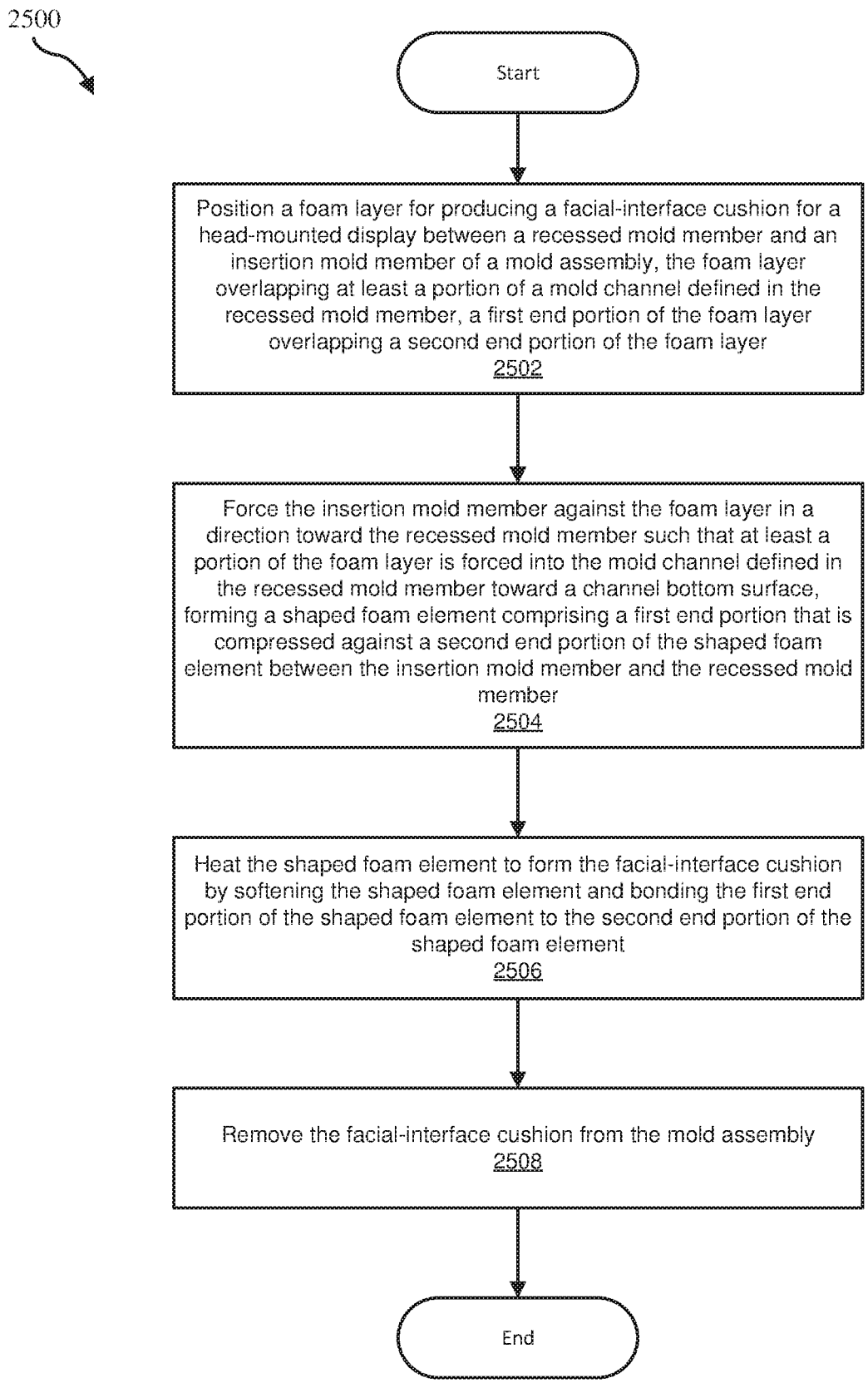
FIG. 25 is a block diagram of an exemplary method for manufacturing a facial-interface cushion for a head-mounted display.

FIG. 25 is a flow diagram of an exemplary method 2500 for manufacturing a facial-interface cushion for a head-mounted display according to any of the embodiments disclosed herein. Steps shown in FIG. 25 may be performed by an individual and/or by any suitable manual and/or automated apparatus.

As illustrated in FIG. 25, at step 2502, a foam layer for producing a facial-interface cushion for a head-mounted display may be positioned between a recessed mold member and an insertion mold member of a mold assembly, with the foam layer overlapping at least a portion of a mold channel defined in the recessed mold member and a first end portion of the foam layer overlapping a second end portion of the foam layer. For example, foam layer 170 may be positioned between recessed mold member 150 and insertion mold member 130 of mold assembly 131 (see, e.g., FIGS. 7-9; see also FIGS. 18 and 19). Foam layer 170 may overlap at least a portion of mold channel 154 defined in recessed mold member 150. Additionally, first end portion 174A of foam layer 170 may overlap second end portion 174B of foam layer 170 (see, e.g., FIGS. 7 and 9; see also FIG. 19).

In some embodiments, the foam layer may include a thermoplastic material and/or a thermosetting material. For example, foam layer 170 may include a thermoplastic material and/or a thermosetting material, such as a thermoplastic and/or thermosetting polymer material (see, e.g., FIG. 4; see also FIGS. 5 and 24). In at least one example, the mold channel defined in the recessed mold member may extend along an arcuate path. For example, mold channel 154 defined in recessed mold member 150 may extend along an arcuate path (see, e.g., FIGS. 3 and 7; see also FIG. 17).

At step 2504 in FIG. 25, the insertion mold member may be forced against the foam layer in a direction toward the recessed mold member such that at least a portion of the foam layer is forced into the mold channel defined in the recessed mold member toward a channel bottom surface, thereby forming a shaped foam element including a first end portion that is compressed against a second end portion of the shaped foam element between the insertion mold member and the recessed mold member. For example, insertion mold member 130 may be forced against foam layer 170 in a direction D1 toward recessed mold member 150 such that at least a portion of foam layer 170 is forced into mold channel 154 toward channel bottom surface 156, thereby forming shaped foam element 180 (see, e.g., FIGS. 8-11; see also FIGS. 18-21). Shaped foam element 180 may include first end portion 187A that is compressed against second end portion 187B between insertion mold member 130 and the recessed mold member 150.

In some embodiments, the first end portion of the shaped foam element may overlap the second end portion of the shaped foam element in a portion of the shaped foam element having a reduced thickness between the insertion mold member and the recessed mold member. For example, first end portion 187A of shaped foam element 180 may overlap second end portion 187B in a portion of shaped foam element 180 having a reduced thickness between insertion mold member 130 and recessed mold member 150 (see, e.g., FIG. 11; see also FIG. 21). The first end portion of the shaped foam element may overlap the second end portion of the shaped foam element in a portion of the shaped foam element corresponding to a portion of the facial-interface cushion shaped to abut a nasal region of a user's face. For example, first end portion 187A of shaped foam element 180 may overlap second end portion 187B in a portion of shaped foam element 180 corresponding to cushion nasal region 197A of facial-interface cushion 126 shaped to abut a nasal region of a user's face (see, e.g., FIGS. 11-14; see also FIGS. 15, 21, and 23).

According to some embodiments, the shaped foam element may further include a curved surface disposed within the mold channel. For example, shaped foam element 180 may include cushion peripheral curved surface 190 and cushion inner curved surface 192 disposed within mold channel 154 (see, e.g., FIGS. 10-12; see also FIGS. 20 and 21). At least a portion of the curved surface of the shaped foam element may contact a curved surface of the recessed mold member defining at least a portion of the mold channel. For example, cushion peripheral curved surface 190 and/or cushion inner curved surface 192 may respectively contact channel peripheral curved surface 164 and/or channel inner curved surface 166 of recessed mold member 150 defining at least a portion of mold channel 154 (see, e.g., FIGS. 8-12 and 14). In some examples, the curved surface of the shaped foam element may not contact at least a portion of the recessed mold member defining the mold channel. For example, cushion peripheral curved surface 390 and/or cushion inner curved surface 392 may not contact at least a portion of recessed mold member 350 defining mold channel 354 (see, e.g., FIGS. 20-23).

According to some embodiments, the shaped foam element may be entirely disposed within the mold channel defined in the recessed mold member. For example, shaped foam element 180 may be entirely disposed within mold channel 154 defined in recessed mold member 150 (see, e.g., FIGS. 10 and 11). In at least one embodiment, a portion of the shaped foam element may disposed outside the mold channel defined in the recessed mold member. For example, outer clamped portion 377A, inner clamped portion 377B, and/or overlapped region 385 of shaped foam element 380 may be disposed outside mold channel 354 defined in recessed mold member 350 (see, e.g., FIGS. 20 and 21). In this example, the portion of the shaped foam element disposed outside the mold channel may be compressed between a surface of the recessed mold member and a surface of the insertion mold member facing the surface of the recessed mold member. For example, outer clamped portion 377A of shaped foam element 380 may be compressed between outer mold facing surface 332A of insertion mold member 330 and outer mold facing surface 352A of recessed mold member 350 (see, e.g., FIG. 20). Likewise, inner clamped portion 377B of shaped foam element 380 may be compressed between inner mold facing surface 332B of insertion mold member 330 and inner mold facing surface 352B of recessed mold member 350. Overlapped region 385 of shaped foam element 380 may be compressed between intermediate mold facing surface 332C of insertion mold member 330 and channel raised surface 362 of recessed mold member 350 (see, e.g., FIGS. 19 and 21).

According to some embodiments, the insertion mold member may include a protruding portion sized to fit within the mold channel defined in the recessed mold member. For example, protruding portion 134 of insertion mold member 130 may be sized to fit within mold channel 154 defined in recessed mold member 150 (see, e.g., FIGS. 10 and 11; see also FIGS. 20 and 21). According to at least one embodiment, forcing the insertion mold member against the foam layer may further include forcing the protruding portion of the insertion mold member against a portion of the foam layer overlapping at least the portion of the mold channel defined in the recessed mold member. For example, protruding portion 134 of insertion mold member 130 may be forced against a portion of foam layer 170 overlapping at least a portion of mold channel 154 defined in recessed mold member 150 (see, e.g., FIGS. 8-11; see also FIGS. 18-21).

At step 2506 in FIG. 25, the shaped foam element may be heated to form the facial-interface cushion by softening the shaped foam element and bonding the first end portion of the shaped foam element to the second end portion of the shaped foam element. For example, shaped foam element 180 may be heated to a temperature sufficient to soften shaped foam element 180 and form the facial-interface cushion 126 (see, e.g., FIGS. 10-14; see also FIGS. 20-23). In some embodiments, shaped foam element 180 may be heated above a specified temperature allowing for softening of shaped foam element 180 and below a temperature at which shaped foam element 180 may begin to melt and/or otherwise lose its structural integrity. For example, shaped foam element 180 including a thermoplastic open-cell polyurethane foam may be heated at a temperature in a range of between approximately 150° C. and approximately 175° C. during molding. First end portion 187A of shaped foam element 180 may be bonded to second end portion 187B during heating (see, e.g., FIGS. 11-14; see also FIGS. 15, 21, and 23).

At step 2508 in FIG. 25, the facial-interface cushion may be removed from the mold assembly. For example, facial-interface cushion 126 may be removed from mold assembly 131 (see, e.g., FIGS. 12-14; see also FIGS. 15, 22, and 23).

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed to manufacture a facial-interface cushion. The various exemplary methods described and/or illustrated herein may also omit one or more of the steps described or illustrated herein or include additional steps in addition to those disclosed.

As discussed throughout the instant disclosure, the disclosed methods, systems, and devices may provide one or more advantages over conventional facial-interface cushions for head-mounted-display systems. For example, the facial-interface cushions described herein may provide comfortable contact regions, including curved inner and peripheral surfaces, abutting facial regions of users wearing head-mounted displays. As such, the described facial-interface cushions may increase user comfort without adding bulk to the facial-interface systems. Furthermore, the facial-interface cushions may include channels that allow for movement of air and facilitate dissipation of heat, preventing user discomfort and fogging of head-mounted display lenses and eyeglasses worn by users. Additionally, the methods described herein may reduce generation of wasted foam material during the manufacturing process by utilizing strip-shaped foam layers. The described methods may enable manufacturing of facial-interface cushions having a variety of beneficial features, such as the curved surface portions and cooling channels. In general, the facial-interface cushions and related head-mounted-display systems disclosed herein may improve immersion and/or enjoyment of using a head-mounted display, making virtual- and augmented-reality experiences more fulfilling or useful.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

Where a range of values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A method comprising:
    positioning a foam layer for producing a facial-interface cushion for a head-mounted display between a recessed mold member and an insertion mold member of a mold assembly, the foam layer overlapping at least a portion of a mold channel defined in the recessed mold member and a first end portion of the foam layer overlapping a second end portion of the foam layer;
    forcing the insertion mold member against the foam layer in a direction toward the recessed mold member such that at least a portion of the foam layer is forced into the mold channel defined in the recessed mold member toward a channel bottom surface, thereby forming a shaped foam element comprising a first end portion that is compressed against a second end portion of the shaped foam element between the insertion mold member and the recessed mold member;
    heating the shaped foam element to form the facial-interface cushion by softening the shaped foam element and bonding the first end portion of the shaped foam element to the second end portion of the shaped foam element; and
    removing the facial-interface cushion from the mold assembly.

2. The method of claim 1, wherein the first end portion of the shaped foam element overlaps the second end portion of the shaped foam element in a portion of the shaped foam element having a reduced thickness between the insertion mold member and the recessed mold member.

3. The method of claim 1, wherein the first end portion of the shaped foam element overlaps the second end portion of the shaped foam element in a portion of the shaped foam element corresponding to a portion of the facial-interface cushion shaped to abut a nasal region of a user's face.

4. The method of claim 1, wherein the shaped foam element further comprises a curved surface disposed within the mold channel.

5. The method of claim 4 wherein the curved surface of the shaped foam element does not contact at least a portion of the recessed mold member defining the mold channel.

6. The method of claim 4, wherein at least a portion of the curved surface of the shaped foam element contacts a curved surface of the recessed mold member defining at least a portion of the mold channel.

7. The method of claim 1, wherein the shaped foam element is entirely disposed within the mold channel defined in the recessed mold member.

8. The method of claim 1, wherein a portion of the shaped foam element is disposed outside the mold channel defined in the recessed mold member.

9. The method of claim 8, wherein the portion of the shaped foam element disposed outside the mold channel is compressed between a surface of the recessed mold member and a surface of the insertion mold member facing the surface of the recessed mold member.

10. The method of claim 1, wherein the mold channel defined in the recessed mold member extends along an arcuate path.

11. The method of claim 1, wherein:
    the insertion mold member comprises a protruding portion sized to fit within the mold channel defined in the recessed mold member; and
    forcing the insertion mold member against the foam layer further comprises forcing the protruding portion of the insertion mold member against a portion of the foam layer overlapping at least the portion of the mold channel defined in the recessed mold member.

12. The method of claim 1, wherein the foam layer comprises at least one of a thermoplastic material or a thermosetting material.

* * * * *